US012260386B2

(12) United States Patent
Hagen et al.

(10) Patent No.: US 12,260,386 B2
(45) Date of Patent: Mar. 25, 2025

(54) SHOPPING CART WITH WEIGHT BUMP VALIDATION

(71) Applicant: Target Brands, Inc., Minneapolis, MN (US)

(72) Inventors: Todd A. Hagen, Minneapolis, MN (US); Andrew Wipf, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 182 days.

(21) Appl. No.: 17/959,454

(22) Filed: Oct. 4, 2022

(65) Prior Publication Data

US 2023/0147385 A1 May 11, 2023

Related U.S. Application Data

(60) Provisional application No. 63/340,702, filed on May 11, 2022, provisional application No. 63/276,474, filed on Nov. 5, 2021.

(51) Int. Cl.
*G06Q 20/20* (2012.01)
*G01G 19/52* (2006.01)

(52) U.S. Cl.
CPC .......... *G06Q 20/208* (2013.01); *G01G 19/52* (2013.01)

(58) Field of Classification Search
CPC .............................. G06Q 20/208; G01G 19/52
See application file for complete search history.

(56) References Cited

U.S. PATENT DOCUMENTS

| 8,371,504 | B2 | 2/2013 | Connelly |
| 9,292,853 | B2 | 3/2016 | Ascarrunz et al. |
| 9,607,486 | B2 | 3/2017 | Acket et al. |
| 10,600,043 | B2 | 3/2020 | Chaubard et al. |
| 10,745,039 | B1 | 8/2020 | Gao et al. |
| 10,845,235 | B2 | 11/2020 | McNeally et al. |
| 10,915,936 | B1 * | 2/2021 | Vora .................. G07G 3/00 |
| 10,953,906 | B1 * | 3/2021 | McMahon ............ B62B 3/1424 |
| 11,381,780 | B2 * | 7/2022 | De Bonet ............ G06Q 20/208 |

(Continued)

OTHER PUBLICATIONS

Bo, Li, Zhang Xiao, and Yan Jingyi. "Design of Intelligent Shopping Cart for Supermarket." Journal of Physics: Conference Series. vol. 1207. No. 1. IOP Publishing, 2019. (Year: 2019).*

*Primary Examiner* — Nathan A Mitchell
(74) *Attorney, Agent, or Firm* — Barnes & Thornburg LLP

(57) ABSTRACT

Described herein are systems and methods for validating products that are added to a shopping cart. A shopping cart that can include product validation hardware and a controller, the product validation hardware including motion sensors positioned at least along a top perimeter of the shopping cart and at least one weight sensor positioned inside the shopping cart. The shopping cart can receive, from one or more of the motion sensors, motion data when the product is detected to be entering a top horizontal plane of the shopping cart, receive, from the at least one weight sensor, weight change data that is collected in real-time as the product settles inside the shopping cart, and correlate the weight change data with the motion data to generate a weight signature over time for the product. The weight signature can be used to validate the product that is added to the shopping cart.

26 Claims, 12 Drawing Sheets

(56) References Cited

U.S. PATENT DOCUMENTS

| | | | |
|---|---|---|---|
| 11,636,457 B1* | 4/2023 | De Bonet | G06Q 20/204 |
| | | | 705/23 |
| 11,884,315 B1* | 1/2024 | Burch | B62B 3/1416 |
| 2012/0284132 A1* | 11/2012 | Kim | G06Q 20/18 |
| | | | 235/375 |
| 2018/0218351 A1* | 8/2018 | Chaubard | G07G 1/0081 |
| 2019/0073656 A1* | 3/2019 | Joseph | G06Q 20/40145 |
| 2020/0275059 A1* | 8/2020 | De Bonet | G06V 10/141 |
| 2021/0117950 A1* | 4/2021 | Bentsur | G01G 19/08 |
| 2021/0177163 A1* | 6/2021 | Cohn | G06Q 20/18 |
| 2022/0157134 A1* | 5/2022 | Sriraman | G07G 1/0072 |
| 2022/0177019 A1* | 6/2022 | Ono | B62B 3/1428 |
| 2022/0198550 A1* | 6/2022 | Meidar | G06Q 20/20 |

* cited by examiner

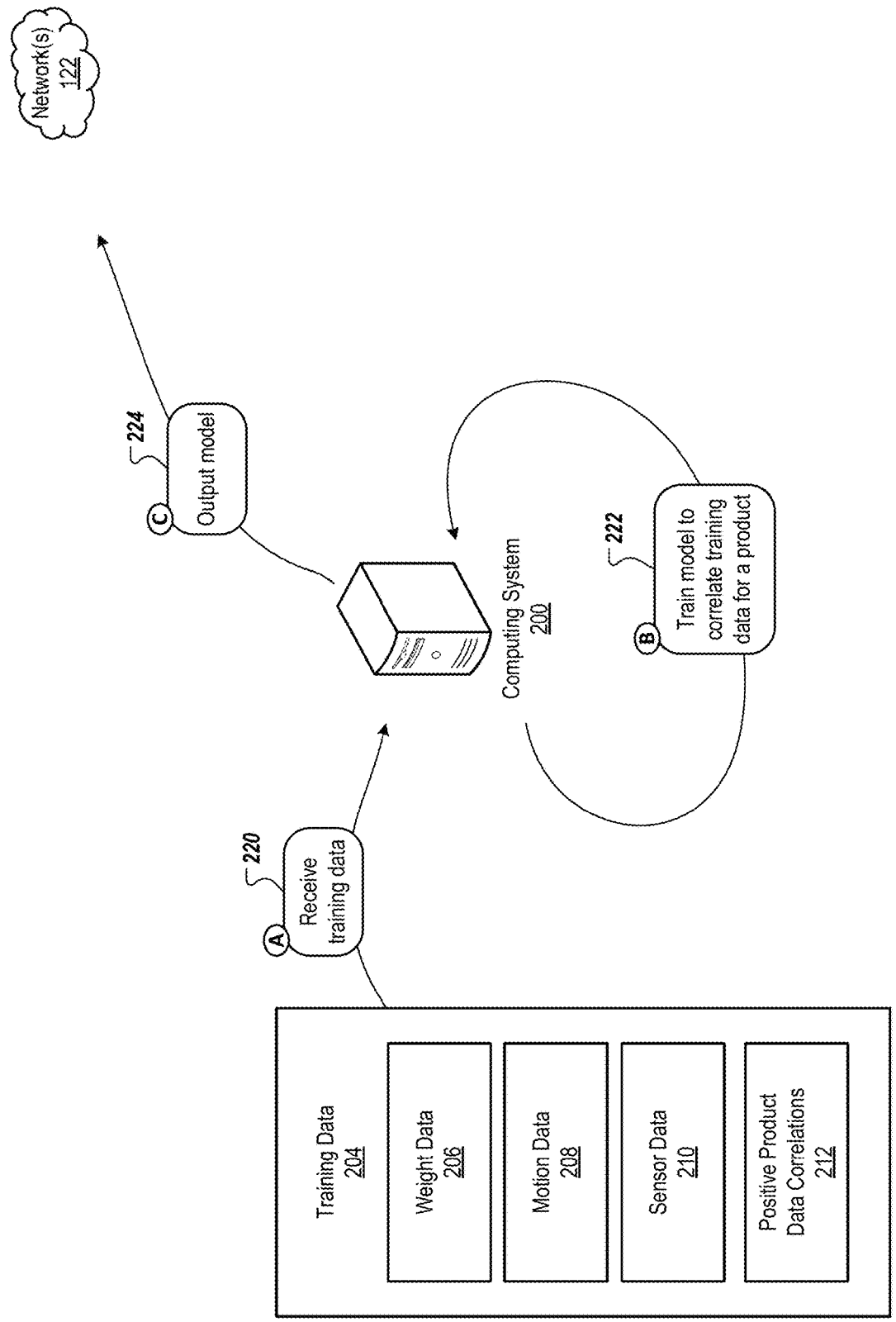

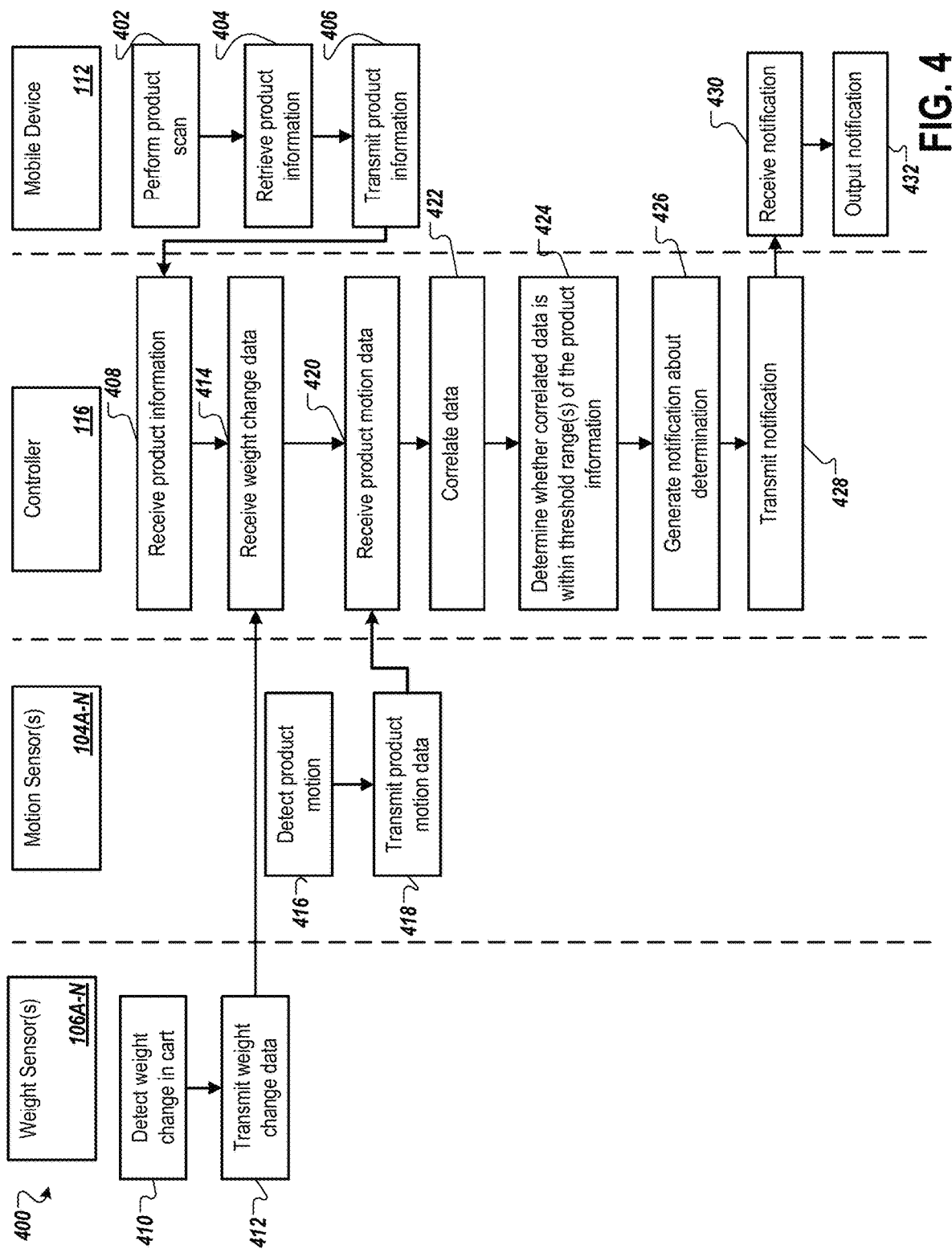

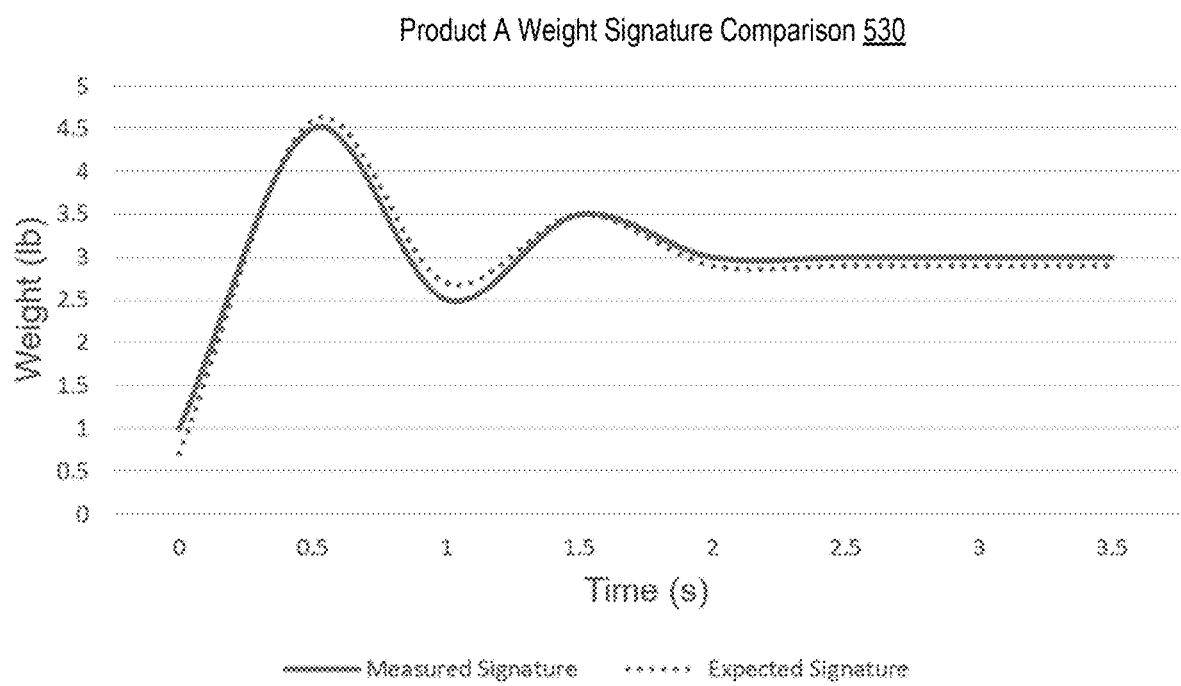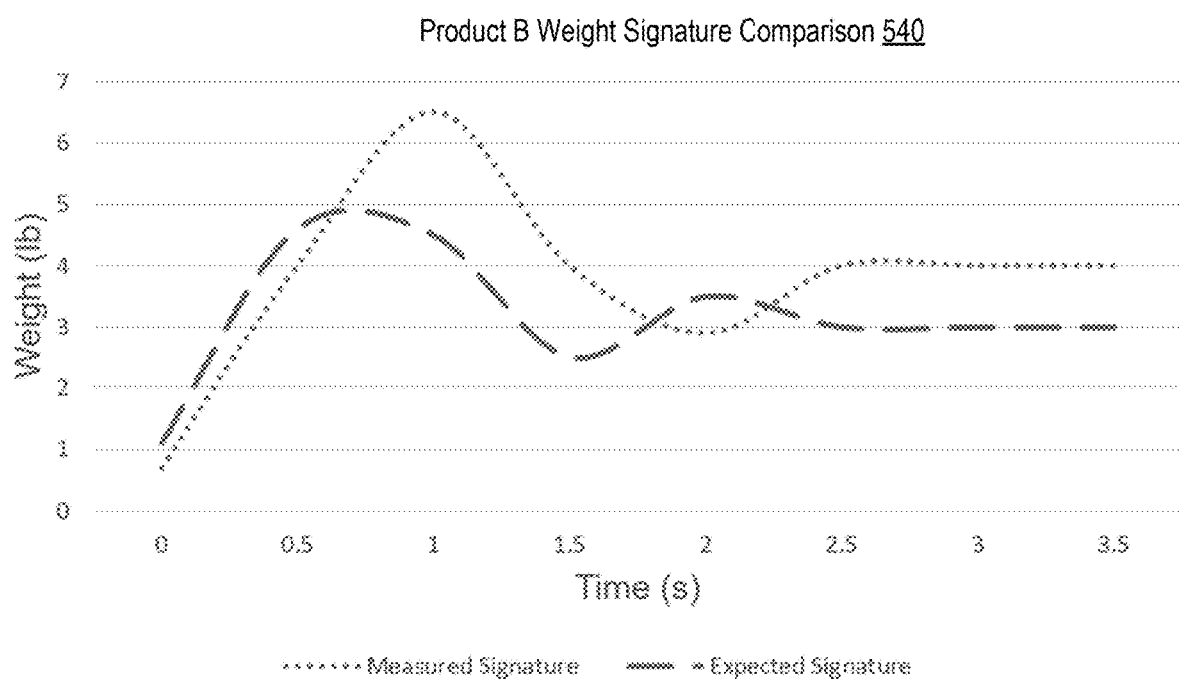
FIG. 5C

SHOPPING CART WITH WEIGHT BUMP VALIDATION

INCORPORATION BY REFERENCE

This application claims priority to U.S. Provisional Application Ser. No. 63/340,702, filed on May 11, 2022 and U.S. Provisional Application Ser. No. 63/276,474, filed on Nov. 5, 2021, the disclosures of which are incorporated by reference in their entirety.

TECHNICAL FIELD

This document generally describes devices, systems, and methods related to validating aspects of items as they added to or removed from a shopping cart.

BACKGROUND

Guests (e.g., customers or other relevant users) can go to retail environments, such as stores, to purchase one or more products. A guest can load a shopping cart with the one or more products they wish to purchase. When they are done collecting those products, the guest can go to a checkout lane in order to complete the transaction process and leave the retail environment.

Retail checkout may occur at checkout lanes where a retail employee scans product identifiers for every product the guest wants to purchase. Retail checkout may also occur at self-checkout lanes/stations where the guest, instead of the retail employee, scans product identifiers for every product the guest wants to purchase. The retail employee's role can change such that the retail employee may divide their attention across overseeing (e.g., reviewing) multiple self-checkout lanes/stations in the retail environment. Sometimes, the retail employee may not notice a guest intentionally or unintentionally leaving the retail environment with a product that they did not scan at the self-checkout lanes, especially since the retail employee's attention is divided over multiple self-checkout lanes.

Some retail environments have permitted guests to use scan and go technology on their mobile devices (e.g., smartphones) to complete retail checkout in the retail environment instead of at a checkout lane or self-checkout lane. Scan and go technology can move the product scanning process further away from review of retail employee(s). Some scan and go systems have used employees to manually check and verify that the guest is leaving the store with only those items scanned and purchased on their mobile device before exiting the retail environment.

SUMMARY

The document generally relates to technology for automatically validating aspects of products (e.g., items) that are added to or removed from a shopping cart in a retail environment (e.g., a store) For example, the disclosed technology can use signals from weight sensors that are included as part of a shopping cart to determine whether a product added to the shopping cart corresponds a product that is expected to be placed in the cart, such as a product that was recently scanned on a mobile device. If the signals from the weight sensors matches or otherwise corresponds to an expected product (i.e., scanned product), then the physical product placed in the cart can be validated as the expected product. However, if the signals do not match or otherwise correspond to the expected product, then the physical product placed in the cart is not validated, which can result in one or more subsequent actions (e.g., request for rescan of product, request for checkout at point of sale terminal). The disclosed technology can perform near instantaneous weight evaluations using weight sensor signals (and without having to wait for the sensor signals to settle out) by analyzing real-time changes in weight (e.g., weight bumps or fluctuations) over time with expected weight changes and/or other sensor data, such as motion of the products as they are added to (or removed from) the cart.

The disclosed technology can be used in combination with and to improve mobile device-based scanning of items and checkout processes, such as scan and go checkout systems. For example, existing scan and go technology presents a variety of problems, including guests potentially placing taking a different item than the item scanned and misidentifying the quantity of products scanned versus taken, both of which can result in shortages for the retailer. Additionally, manual checks to ward against shortages with scan and go checkouts can present a variety of drawbacks, such as slowing down the checkout/departure process (mitigating some of the benefits of using scan and go technology), increasing labor costs for dedicated manually checkers, and potentially failing to remedy these issues due to potential human error during the checking process. The disclosed technology can resolve these and/or other problems with scan and go type systems. For example, the disclosed technology can provide for more accurate, granular, and efficient validation of scanned items as shopping progresses—meaning verifying that the physical item added to a shopping cart is the item that was scanned (and in the same quantity as recorded as part of the scan). This can provide a variety of benefits, such as reducing shortages and other inconsistencies between the physical goods that a guest leaves with and those that the guest pays for during the checkout process. For example, a guest may only be presented with an option to checkout on their mobile device if each scanned item has been validated by the shopping cart, and may otherwise be directed to physical checkout lanes if there are inconstancies between the scanned items and the physical items in the cart. This can permit for guests with fully validated carts to more quickly and readily checkout, can reduce the manual effort to manage such checkout processes for retailers, and can provide for greater levels of trust between retailers and guests using scan and go type systems, which can increase the prevalence and availability of such systems for guests across retail environments.

As part of the disclosed technology, a shopping cart can include different types of sensors such as weight sensors. The shopping cart can also include motion sensors or other optical flow sensors. The shopping cart can also include a controller that can perform the disclosed techniques. In some implementations, validating a product that is added to the cart can be performed by a guest's mobile device instead of or in combination with the cart's controller or another computing system. The weight sensors can detect immediate changes in weight, or weight bumps, as products are placed in the cart. The detected weight bumps can be analyze in real-time (or near real-time) to differentiate between products and/or quantities of products that are added to (or removed from) the cart. Immediate weight data that is measured in the cart while a guest pushes the cart around the retail environment can be used to make faster validation (e.g., verification) determinations about what the guest is purchasing. In other words, the weight data can be correlated in real-time with other sensor data, such as motion data, to determine whether the products scanned by the guest's mobile device match (or are sufficiently close to) the products that are placed in the cart. One or more machine learning trained models can be used to correlate the various sensor data and validate the product.

Detected weight data can be compared to expected weight data for a product that is scanned by the mobile device. If the detected weight data is within a predetermined threshold range of the expected weight data, then the product can be validated. If the detected weight data is not within the predetermined threshold range of the expected weight data, then the product may not be validated. If the product is not validated, the guest can receive a notification at their mobile device requesting that they scan the correct product(s) and/or put the correct scanned product(s) in the cart.

One or more other collected data, such as motion data when the product is being added to or removed from the cart, can be correlated with the weight data and used to validate the product. For example, motion sensors and/or optical flow sensors on the cart can detect a speed at which the product enters the cart. The speed can be correlated with other signals such as the immediate weight measurements of the product being added to the cart to validate whether the product entering the cart is the product that was scanned by the guest's mobile device (e.g., the expected product). As an illustrative example, a product that is thrown into the cart or dropped into the cart can be expected to weigh less than a product that is slowly placed in the cart with both the guest's hands. If the product that is thrown into the cart or the product that is slowly placed in the cart does not match the weight data for the expected product, then the guest can be notified that the product added to the cart is not validated.

Validating the product means that the guest can complete their transaction while in the retail environment and at their mobile device. As a result, the guest can walk out of the retail environment with the cart full of validated products and a completed transaction instead of waiting in line to complete a traditional checkout process at a checkout lane or station.

One or more embodiments described herein can include a system for validating products that are added to a shopping cart, the system including a shopping cart that can retain one or more products and be pushed by a user in a retail environment. The shopping cart can include product validation hardware and a controller, the product validation hardware including motion sensors positioned at least along a top perimeter of the shopping cart and at least one weight sensor positioned inside the shopping cart. The shopping cart can be configured to receive, from one or more of the motion sensors, motion data when the product is detected to be entering a top horizontal plane of the shopping cart, receive, from the at least one weight sensor, weight change data that is collected in real-time as the product settles inside the shopping cart, and correlate the weight change data with the motion data to generate a weight signature over time for the product. The weight signature can be used to validate the product that is added to the shopping cart.

In some implementations, the embodiments described herein can optionally include one or more of the following features. For example, the system can also include a mobile device in communication with at least one of the product validation hardware and the controller of the shopping cart. The mobile device can receive user input indicating a scan of the product to be added to the shopping cart, identify a unique identifier for the product based on the scan, and retrieve, from a data store and based on the unique identifier, product information for the scanned product.

In some implementations, the mobile device can also receive, from the shopping cart, the weight signature over time for the product, compare the weight signature to the product information of the scanned product to determine whether the weight signature is within a predetermined threshold range of the product information, and generate, based on determining that the weight signature is within the predetermined threshold range of the product information, output indicating that the product added to the shopping cart is validated.

Sometimes, comparing the weight signature to the product information can include graphing the weight signature as a curve with an expected weight change signature curve for the scanned product and comparing at least one of (i) timing of inflection points of the weight signature curve and the expected weight change signature curve within a predetermined time interval, (ii) maximum amplitude of the weight signature curve and the expected weight change signature curve within the predetermined time interval, and (iii) minimum amplitude of the weight signature curve and the expected weight change signature curve within the predetermined time interval.

In some implementations, the mobile device can transmit, to the shopping cart, the product information of the scanned product, and the shopping cart can compare the weight signature to the product information of the scanned product to determine whether the weight signature is within a predetermined threshold range of the product information and generate, based on determining that the weight signature is within the predetermined threshold range of the product information, output indicating that the product added to the shopping cart is validated. In some implementations, the shopping cart can poll the at least one weight sensor for weight change data based on receiving the motion data from the one or more of the motion sensors.

One or more embodiments described herein can include a system for validating products that are added to a shopping cart, the system including a shopping cart that can retain one or more products and be pushed by a user in a retail environment, and a mobile device. The shopping cart can include product validation hardware and a controller, the product validation hardware including motion sensors positioned at least along a top perimeter of the shopping cart and at least one weight sensor positioned inside the shopping cart. The mobile device can be in communication with at least one of the product validation hardware and the controller of the shopping cart. The mobile device can receive user input indicating a scan of a product to be added to the shopping cart, identify a unique identifier for the product based on the scan, retrieve, from a data store and based on the unique identifier, product information for the scanned product, and transmit, to the controller, the product information. The controller of the shopping cart can then receive, from the mobile device, the product information, receive, from one or more of the motion sensors, motion data when the product is detected to be entering a top horizontal plane of the shopping cart, receive, from the at least one weight sensor, weight change data that is collected in real-time as the product settles inside the shopping cart, correlate the weight change data with the motion data to generate correlated data, compare the correlated data to the product information of the scanned product to determine whether the correlated data is within a predetermined threshold range of the product information, and generate, based on determining that the correlated data is within the predetermined threshold range of the product information, output indicating that the product added to the shopping cart is validated.

In some implementations, the embodiments described herein can optionally include one or more of the following features. For example, correlating the weight change data with the motion data can include determining a velocity of the product based on the motion data. The motion data can include at least one of position translation data, rotational data, and movement data of the product as it enters the shopping cart and settles inside the shopping cart.

In some implementations, the correlated data can be generated based on applying a machine learning trained model to the weight change data and the motion data. The model was trained using a process that includes receiving training data for one or more other products that includes weight data, motion data, other sensor data, and positive product data correlations, training the model to correlate the received training data for the one or more other products, and outputting the model for runtime use.

Moreover, the product information can include an expected weight change signature curve for the scanned product. Comparing the correlated data to the product information can include graphing the correlated data as a curve with the weight change signature curve and comparing at least one of (i) timing of inflection points of the correlated data curve and the weight change signature curve within a predetermined time interval, (ii) maximum amplitude of the correlated data curve and the weight change signature curve within the predetermined time interval, and (iii) minimum amplitude of the correlated data curve and the weight change signature curve within the predetermined time interval. In some implementations, correlating the weight change data with the motion data to generate correlated data can include scaling the weight change data based on the expected weight change signature curve for the scanned product.

In some implementations, the motion data can be received at a first time and the weight change data can be received at a second time. The first time can be the same as the second time. The first time can be earlier than the second time. The first time can also be later than the second time.

Moreover, the controller can poll the at least one weight sensor for weight change data based on receiving the motion data from the one or more of the motion sensors. Sometimes, the mobile device can receive the output indicating that the product added to the shopping cart is validated and receive user input indicating a scan of another product that is to be added to the shopping cart. In yet some implementations, the mobile device can receive the output indicating that the product added to the shopping cart is validated and complete a checkout process at the mobile device.

In some implementations, the controller can generate, based on determining that the correlated data is not within the predetermined threshold range of the product information, output indicating that the product added to the shopping cart is not validated. The output can include a notification to be presented to the user at the mobile device that prompts the user to (i) rescan the product that was added to the shopping cart or (ii) put a correct product that corresponds to the scanned product in the shopping cart. The controller can also generate, based on determining that the correlated data is not within the predetermined threshold range of the product information, instructions that, when executed at the mobile device, may prevent the user from continuing to scan products with the mobile device until the product that was added to the shopping cart is validated. The output can also include a notification to be transmitted to a computing device of a retail environment employee for presentation to the retail environment employee, the notification indicating that the user is engaging in suspicious activity.

Moreover, the mobile device can be configured to identify the unique identifier for the scanned product based on the scan and transmit the unique identifier to the controller, and the controller can be configured to retrieve, from the data store and based on the unique identifier, the product information for the scanned product. Sometimes, the mobile device can also receive the correlated data from the controller and compare the correlated data to the product information of the scanned product to determine whether the correlated data is within a predetermined threshold range of the product information.

The devices, system, and techniques described herein may provide one or more of the following advantages. For example, detection and analysis of immediate weight changes in a shopping cart can provide fast, real-time validation determinations to be made about what products and quantities of products are put in the cart. Validation determinations can be accurately made in real-time without having to wait until weight settles out in the cart. Fast and accurate product validation can also allow for a fast and seamless checkout process. The guest, therefore, can complete the checkout process from their mobile device and simply walk out of the retail environment with the purchased products in their cart instead of having to wait in line to complete a traditional checkout process at a checkout station or lane.

As mentioned above, the transaction can be completed in real-time at the guest's mobile device instead of at a checkout lane/station since the disclosed techniques can provide for ensuring product class and quantity correctness for the purpose of accurately charging the guest for the products placed in the cart. The disclosed techniques can also provide for ensuring deduction of a correct product class and quantity from inventory tracking systems in order to automatically, and in real-time, trigger replenishment and/or reorder workflows in the retail environment.

The disclosed techniques can also leverage machine learning techniques, such as machine learning trained models, to correlate different sensor signals (e.g., weight, motion, etc.) and validate products that are added to the cart in real-time. This can provide for fast and accurate determinations about whether the guest is putting the expected product and quantity of the product in the cart.

As another example, the disclosed techniques can be used for identifying product shortages in the retail environment and quickly addressing those shortages. For example, the disclosed techniques can provide for determining if and when a guest places a product in the cart that does not match a product scanned by the guest's mobile device. Such determinations can be flagged as potential suspicious activity, such as ticket switching. The guest can be notified to place the correct product in their cart. Retail environment employees (e.g., in-store employees) may also be notified about the potential suspicious activity. The employees can monitor the guest and/or approach the guest before they leave the retail environment to verify the products that the guest is purchasing. Thus, the retail environment employees and other relevant stakeholders/users can become aware of product shortages and can take steps to address those shortages.

As yet another example, the disclosed techniques can be economical to implement in quantity across many retail environments. The weight, motion, and other sensors deployed on a shopping cart can be low cost components having low power and processing consumption. The disclosed techniques can reduce computational complexity, use of computational resources, and power consumption compared to approaches that leverage high resolution video and/or depth signals to perform 3D product modeling. Moreover, the low cost components can be easily replaced or otherwise repaired if such components require any type of servicing.

Similarly, the disclosed techniques can leverage processing power of the cart controller and/or the guest's mobile device to validate products in real-time. The mobile device, for example, can utilize less computing resources than a central computing system for the retail environment or a network of retail environments and can have strong processing power. Processing at the mobile device can be efficient and avoid clogging network bandwidth. Reduction in sensor and compute requirements can also reduce power consumption. Reduced processing and power consumption can therefore result in quick validation determinations being made and an improved, expedited retail checkout process for the guest.

The details of one or more implementations are set forth in the accompanying drawings and the description below. Other features and advantages will be apparent from the description and drawings, and from the claims.

BRIEF DESCRIPTION OF THE DRAWINGS

FIG. 2 is a conceptual diagram for training one or more machine learning models that are used to validate products using the disclosed techniques.

FIG. 4 is a swimlane diagram of a process for validating a product using the disclosed techniques.

FIG. 5C are graphical depictions comparing the expected weight signatures with actual weight signatures for the products.

Like reference symbols in the various drawings indicate like elements.

DETAILED DESCRIPTION OF ILLUSTRATIVE EMBODIMENTS

This document generally relates to validating products (e.g., items) that are added to a shopping cart in a retail environment (e.g., store). More specifically, a guest can scan a product with their mobile device and then put the product in their cart. The disclosed techniques can provide for detecting sudden weight changes and other sensory signals as the product is added to (or removed from) the cart. The detected weight changes and sensory signals can be correlated and compared to expected data associated with the scanned product. If the correlated data matches or is similar to (e.g., within a predetermined threshold range of) the expected data, the product added to the cart can be validated. If the correlated data does not match or is not similar to the expected data, the product may not be validated. One or more of the disclosed techniques of data collection, correlation, analysis, and product validation can be performed by various devices and/or computing systems, including but not limited to a cart controller and the guest's mobile device. Performing one or more of the disclosed techniques at the guest's mobile device, for example, can be advantages to leverage the mobile device's processing power for fast and accurate validation determinations. As a result, the guest can experience a fast, seamless, and efficient checkout process at their mobile device instead of having to wait in line to complete a traditional checkout process at a checkout lane or station.

Figure 1A:
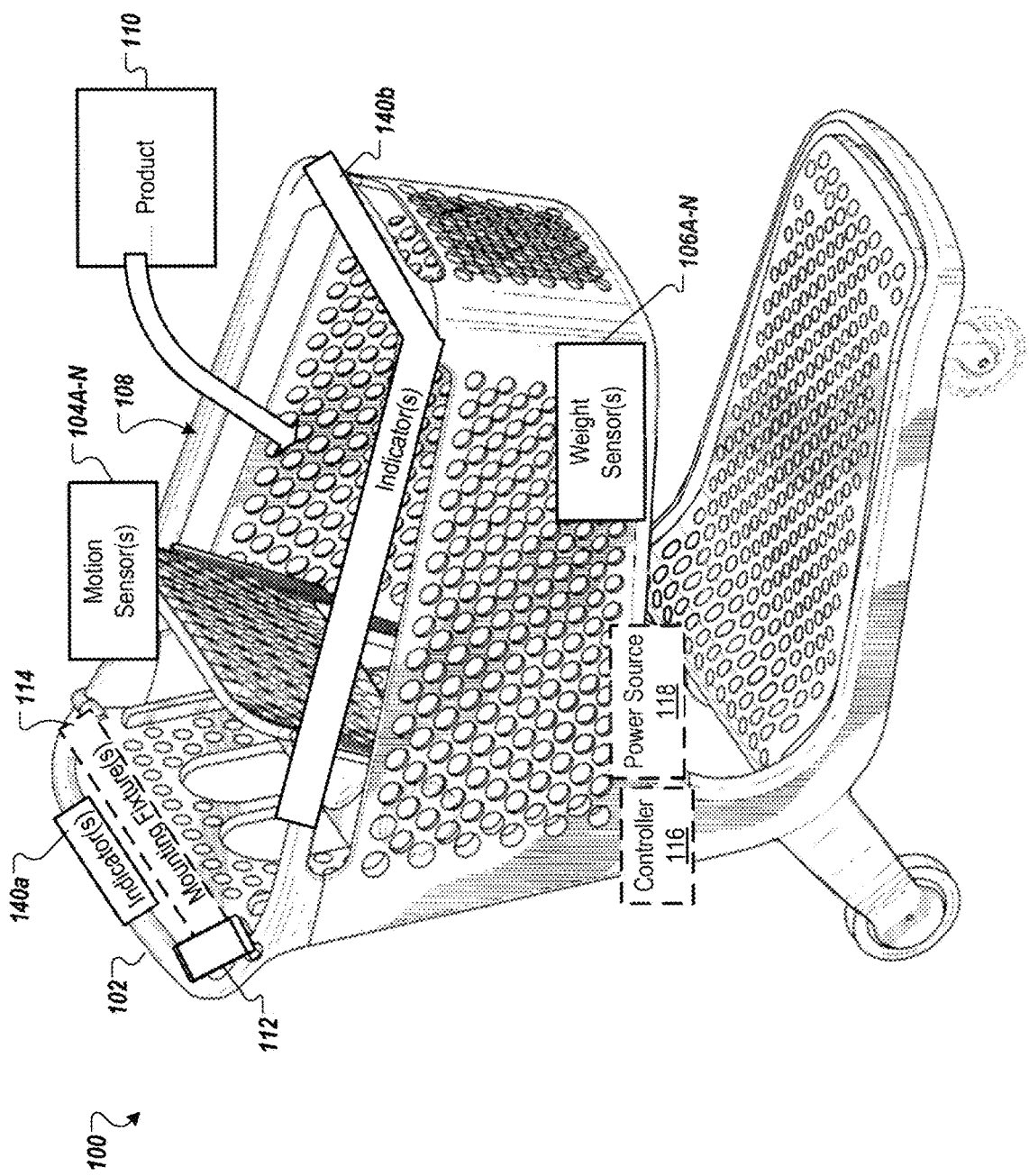
FIGS. 1A-B illustrate conceptual diagrams of a shopping cart that can implement weight bump validation techniques described herein to validate products as they are added to or removed from the shopping cart.
Figure 1B:
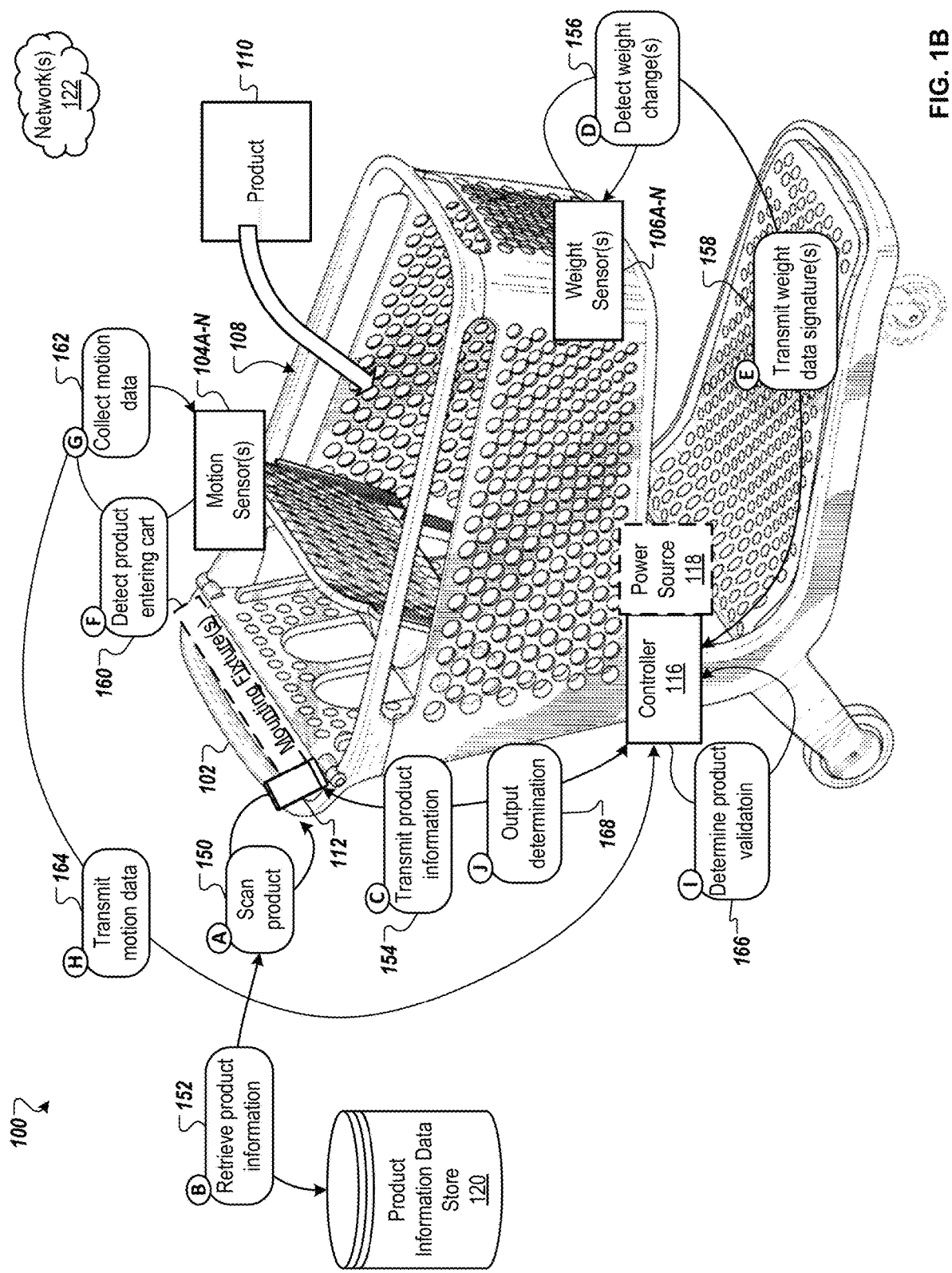

Referring to the figures, FIGS. 1A-B illustrate conceptual diagrams of a shopping cart 100 that can implement weight bump validation techniques described herein to validate products as they are added to or removed from the shopping cart 100. As shown in FIG. 1A, the shopping cart 100 can be a smart cart. In some implementations, the shopping cart 100 can be a preexisting shopping cart in the retail environment that has been modified/updated to include one or more components used for performing the weight bump validation techniques described herein. Since the components used for weight bump validation can be low cost, it can be easy and less expensive to modify existing shopping carts in the retail environment with the components.

The shopping cart 100 can include an optional mounting fixture(s) 114 near a handle 102 of the cart 100, motion sensors 104A-N, weight sensor(s) 106A-N, an optional controller 116, an optional power source 118, and indicators 140A-B. The mounting fixture(s) 114 can have a housing or other configuration that can removably receive a mobile device 112 (e.g., smart phone, mobile phone, cellphone, tablet, etc.) of a user, such as a guest or customer in the retail environment. The housing or other configuration can be sized to fit mobile devices of varying sizes. The mounting fixture(s) 114 can also be located at one or more other regions of the shopping cart 100 to facilitate ease of access, attachment, and removal of the mobile device 112 from the shopping cart 100.

The motion sensor(s) 104A-N can be configured to collect motion data of product 110 when it is added to or removed from the cart 100. The motion sensor(s) 104A-N can also collect position translation data, vertical motion data, and/or rotational data of the product 110 relative to the sensors(s) 104A-N, which can be used (e.g., by the controller 116) to determine a velocity of the product 110. In some implementations, the motion sensor(s) 104A-N can include optical flow sensors (e.g., infrared, IR, optical flow sensors). The motion sensor(s) 104A-N can be attached to one or more regions of the cart 100. For example, the motion sensor(s) 104A-N can be positioned along a top perimeter 108 of the shopping cart 100 to define a top horizontal plane of the cart 100. The motion sensor(s) 104A-N can be arranged in a single line and sufficiently spaced apart (e.g., 5 mm between each sensor) to reliably detect motion data across the top horizontal plane of the cart 100 when the product 110 is added to or removed from the cart 100. The motion sensor(s) 104A-N can also be positioned at one or more other regions of the cart, including but not limited to at corners of the cart 100, near a front end of the cart 100, near the handle 102, and/or along one or both of right and left sides of the cart 100. In some implementations, the cart 100 can include one motion sensor 104A. In some implementations, the cart 100 can include any quantity of motion sensors 104A-N.

The weight sensor(s) 106A-N can be positioned along a bottom inside of the shopping cart 100 (e.g., in a basket of the cart 100). The weight sensor(s) 106A-N can detect immediate changes in weight in the cart 100 as the product 110, and other products, are added to or removed from the cart 100. The cart 100 can have one weight sensor 106A. The cart 100 can also have multiple weight sensors 106A-N. The weight sensor(s) 106A-N can be positioned in one or more regions of the bottom inside of the shopping cart 100. For example, the weight sensors 106A-N can be arranged in a grid structure on the bottom inside of the shopping cart 100.

The optional controller 116 can be in communication (e.g., wired, wireless) with the mobile device 112, the motion sensor(s) 104A-N, and the weight sensor(s) 106A-N. The controller 116 can include one or more processors, CPU, RAM, and/or I/O. The controller 116 can perform one or more of the techniques described herein. As described herein, one or more of the techniques can also be performed by the mobile device 112, instead of or in addition to being performed by the controller 116.

The optional power source 118 can provide power to one or more components of the shopping cart 100, including but not limited to the motion sensor(s) 104A-N, the weight sensor(s) 106A-N, and the controller 116. In some implementations, the power source 118 may also provide power to the mobile device 112 (e.g., to charge the device 112) while and/or when the mobile device 112 is mounted at the mounting fixture(s) 114.

The indicator(s) 140A-B can include one or more output devices (e.g., indicator lights, speakers, tactile devices, etc.) on or near the handle 102 of the shopping cart 100 and/or around a top perimeter of the cart 100 (e.g., a ring of upward-facing indicator lights around the horizontal plane 114). In general, the indicator(s) 140A-B can be configured to convey verification status information that pertains to an addition of an item to the cart 100, and/or an overall state of the cart 100. In some implementations, the indicator(s) 140A-B can be configured to provide verification status information to a user of the shopping cart 100 instead of, or in addition to, verification status information provided by the mobile device 112. For example, the indicator(s) 140A-B can include a first indicator that indicates a successful item verification (e.g., a green light, a chime tone, etc.), and can include a second indicator that indicates an unsuccessful item verification (e.g., a red light, a buzzer tone, etc.). In some implementations, the indicator(s) 140A-B can be configured to provide information that indicates an overall state of the shopping cart 100. For example, the indicator(s) 140A-B can include different indicators (e.g., different colored lights, different light intensities, and/or different flashing light patterns) that indicate whether the cart 100 is active, is inactive, is malfunctioning, is waiting for an item to be added, has detected that an item has been added (e.g., either with or without an indication of whether the item has been successfully or unsuccessfully verified), and/or other suitable cart states. As another example, the indicator(s) 140A-B can include different indicators for directing a user during a checkout process. For example, the indicator(s) 140A-B can include a first indicator (e.g., a green light) that indicates that a transaction is complete and that a customer may leave the store, a second indicator (e.g., a yellow light) that indicates that a user is to proceed to a station where a partial check of the cart contents is performed (e.g., by an employee), and a third indicator (e.g., a red light) that indicates that a user is to proceed to a manual checkout station where the entire cart contents are determined and the transaction is completed. In some implementations, the indicator(s) 140A-B can be an LED light bar and/or an LED light strip. One or more other light configurations can be used for the indicator(s) 140A-B.

FIG. 1B illustrates an example weight bump validation process as performed by the shopping cart 100 of FIG. 1A. One or more components depicted in FIG. 1B, such as the controller 116, the mobile device 112, the motion sensor(s) 104A-N, the weight sensor(s) 106A-N, and a product information data store 120 can communicate via network(s) 122. The network(s) 122 can provide communication via Wifi, Bluetooth technology, long range (LoRa), etc.

The weight bump validation process can begin when a user (e.g., shopper, guest, customer) scans the product 110 with their mobile device 112 (step A, 150). An application, for example, can be presented at the mobile device 112 and can provide the user with an option to scan products they wish to purchase. When the products are scanned, the products can be added to a virtual shopping cart and a transaction for a current shopping experience can be updated to include the scanned products. The user can therefore complete the transaction (e.g., complete a retail checkout process) at the mobile device 112 instead of having to wait in line to complete a traditional checkout process at a checkout lane or station in the retail environment. Since the user can seamlessly and efficiently complete the transaction at the mobile device 112, the user can simply walk out of the retail environment with the product 110 and other purchased products in the cart 100.

The user can scan a product identifier, such as a barcode, of the product 110 with their mobile device 112. Using the scanned identifier, the mobile device 112 can retrieve product information from the product information data store 120 (step B, 152). In other words, the mobile device 112 can request information for a product that is associated with the scanned product identifier.

The information can include expected weight data for the scanned product. For example, the information can include known weight signatures for the scanned product that demonstrate weight changes over time (e.g., a weight curve over time) as the scanned product is placed in a shopping cart. The information can also include expected velocity or other motion data for the scanned product. In some implementations, the information may also include product dimensions, product type, price, relevant promotions/offers, etc. The mobile device 112 can transmit the retrieved product information to the controller 116 (step C, 154). Once the user scans the product 110, the user can put the product 100 in the shopping cart 100.

The weight sensor(s) 106A-N can detect sudden (e.g., instantaneous, immediate) changes of weight in the cart 100 when the product 110 is put in the cart 100 (step D, 156). The weight sensor(s) 106A-N can transmit weight data signatures to the controller 116 (step E, 158) once the changes in weight are detected in step D (156).

The motion sensor(s) 104A-N can also detect when the product 110 is entering the cart 100 (step F, 160). Step F can be performed before, during, and/or after weight change is detected by the weight sensor(s) 106A-N in step D (156). For example, the motion sensor(s) 104A-N can detect the product 110 passing through the top horizontal plane at the top perimeter 108 of the cart 100 before the weight sensor(s) 106A-N can detect a change or changes in weight inside the cart 100.

The motion sensor(s) 104A-N can, in some implementations, detect when an infrared (IR) beam of light is broken by the product 110 passing through the top horizontal plane at the top perimeter 108 of the cart 100. This can indicate that the product 110 is entering the cart and that motion data should be collected. In some implementations, the motion sensor(s) 104A-N can simply sense/detect movement at the top perimeter 108 of the cart 100 and thus begin collecting motion data (step G, 162). The motion data can be collected until the motion sensor(s) 104A-N no longer detect movement at or near the top perimeter 108 of the cart 100. In some implementations, the motion data can be collected until the motion sensor(s) 104A-N no longer detect that an IR beam of light is broken.

As described herein, the motion data can include positional translation information, rotational data, and/or movement data of the product 110 relative to positions of the motion sensor(s) 104A-N in the cart 100. The collected motion data can be transmitted, by the motion sensor(s) 104A-N, to the controller 116 (step H, 164). In some implementations, the controller 116 can process the motion data to determine a velocity of the product 110 and/or a position over time curve for the product 110. The motion data can be used by the controller 116 to validate the product 110.

The controller 116 can determine product validation in step I (166). In other words, the controller 116 can determine whether the weight data signature(s) and the motion data match, are similar to, or are sufficiently close to the expected product information for the scanned product. As described further herein, the controller 116 can determine, for example, whether the weight data signature(s) detected by the weight sensor(s) 106A-N are within predetermined threshold ranges of expected weight signatures that are included in the product information for the scanned product. The controller 116 can also apply one or more machine learning trained models to the received motion data and/or weight data signatures in order to correlate the data and validate the product 110. The controller 116 can validate the product if the detected weight data signature(s) and/or the detected motion data are within predetermined ranges and/or clusters of the product information for the scanned product. The controller 116 may not be able to validate the product if the detected weight data signature(s) and/or the detected motion data are not within predetermined ranges of the product information for the scanned product.

Sometimes, in step I (166), the controller 116 can analyze the weight data signatures and determine which peaks in the weight data signatures are associated with different products. For example, the controller 116 can determine a slope for a weight data signature. That slope can indicate a first product that has been added to the cart 100. Once the slope exceeds a threshold or other predetermined value, the controller 116 can determine that the weight data signature now corresponds to another product (e.g., a second product) that has been added to the cart 100 after the first product. The controller 116 can then isolate the portions of the weight data signature associated with each of the products to validate the first product and to validate the second product. In some implementations, the controller 116 can simply identify peaks and valleys in the weight data signature to different the first product from the second product. For example, an initial dip to a valley in the weight data signature and then a rise to a peak directly after can indicate that data after the valley is associated with the second product and data before the valley is associated with the first product. One or more other techniques can also be used to determine which portions of the weight data signature correspond to which products as those products are added to the cart 100.

In step I (166), the controller 116 can also determine a quantity of the product 110 entering the cart 100. For example, if the controller 116 registers four successive and distinct weight signatures (e.g., changes) that are within some threshold of each other (e.g., they are all relatively the same), the controller 116 can determine that four of the same product 110 was put into the cart 100. When the controller 116 makes such a determination, the determination may not prevent the user of the cart 100 from completing the checkout process. To determine the quantity of the product 110 entering the cart 100, the controller 116 can identify two weight signatures at a same time and/or within a threshold amount of time of each other, where the two weight signatures are relatively the same (e.g., same or similar in amplitude, same or similar in settling out, etc.). If the products are detected as entering the cart at the same time, the controller 116 can receive a weight signature having an amplitude that is double what is expected for a single product. This information can be used to determine that two of the same products have been put in the cart 100. For example, such weight signature(s) can be compared to weight signatures for particular clusters of products to determine whether the products are valid and a quantity of greater than one. In some implementations, one or more aspects of the product validation process can be performed by the mobile device 112, in addition to or instead of the controller 116.

The controller 116 can transmit and output its validation determination at the mobile device 112 (step J, 168). For example, once the product 110 is validated, the mobile device 112 can complete a checkout process (e.g., automatically or based on user input indicating a desire to complete the checkout process). That way, the user may not have to wait in line to complete the checkout process at a checkout station/lane. As another example, once the product 110 is validated, the user can continue scanning other products with their mobile device 112 and the steps A-J can be repeated for each product that the user adds to the cart 100/wishes to purchase. The user can also be presented a notification, message, or other form of output at the mobile device 112 indicating that the product 110 is validated.

If the determination is that the product 110 is not validated, a notification, message, or other form of output can be presented at the mobile device 112 indicating that the user should rescan the product 110 or put the correct product in the shopping cart 100. One or more other notifications can also be generated as described throughout this disclosure.

Although not depicted, in some implementations, the product validation determination can be transmitted to and outputted at another computing system, device, and/or data store. For example, the determination can be transmitted to a user device of a retail environment employee who can be tasked with reviewing potential security vulnerabilities and/or suspicious activity in the retail environment. If the controller 116 determines that the product 110 does not match the product identifier that was scanned by the guest, then the controller 116 can transmit a notification to the user device of the retail environment employee indicating that the product 110 is not validated. The retail environment employee may decide to monitor the guest to determine whether the guest is engaging in suspicious activity, such as ticket switching.

In some implementations, steps A-B (150-152) can be performed at a different time and/or during one or more other steps described in FIG. 1B. Sometimes, one or more of the steps can be performed by one device, such as the mobile device 112, or by multiple devices, as depicted in FIG. 1B. In some implementations, one or more of the steps can be performed by a cloud-based system and/or in a cloud-based service.

FIG. 2 is a conceptual diagram for training one or more machine learning models that are used to validate products using the disclosed techniques. More particularly, the models can be used to correlate different types of data associated with a product. The correlated data can then be compared to expected data for that product to validate the product.

A computing system 200 can train the models using machine learning. The models can be convolutional neural networks (CNNs) or other multi-layered machine learning based approaches. The computing system 200 can be a remote system, a computer system of a retail environment and/or a network of retail environments, a cloud-based system, and/or a cloud-based service. Once the models are trained by the computing system 200, the models can be stored in a data store for later retrieval by the controllers 116 of shopping carts 100 and/or mobile devices 112 of users (e.g., guests) in the retail environment. Once the models are trained, the models can also be transmitted to one or more controllers 116 and/or mobile devices 112 for runtime use with the disclosed techniques.

Although the training in FIG. 2 is described in reference to training a model, multiple models can be trained using the same techniques. Referring to the training in FIG. 2, the computing system 200 can receive training data 204 in step A (220). The training data 204 can be retrieved from a data store. The training data 204 can also be received from one or more other computing systems in communication with the computing system 200 via the network(s) 122.

The training data 204 can include weight data 206, motion data 208, sensor data 210, and positive product data correlations 212. One or more other types of data can be included in the training data 204. The weight data 206 can be collected over time for a variety of products as they are put into shopping carts. The weight data 206 can measure fluctuations or changes (e.g., bumps) in weight in shopping carts when different products are placed, tossed, thrown, or otherwise put into the shopping carts. The motion data 208 can be collected over time for a variety of products as they are put into shopping carts. The motion data 208 can measure different speeds, rotation, movement, and or positioning of the different products as they are placed, tossed, thrown, or otherwise put into the shopping carts. The sensor data 210 can also be collected over time for a variety of products as they are put into shopping carts. The sensor data 210 can include information such as RFID scans, image data, and/or shadow maps of light obstructed by a product as it enters a shopping cart. The positive product data correlations 212 can be actual, verified correlations of different data for the variety of products. In some implementations, the correlations can be curves or other graphs indicating weight change over time for a product. As another example, the correlations can be curves or other graphs indicating projected weight change over some timeframe for the product.

The computing system 200 can train a model to correlate the training data 204 for a product in step B (222). For example, for each product, the computing system 200 can map the weight data 206, motion data 208, and other sensor data 210 into n-dimensional (e.g., 2D, 3D, 4D, etc.) space. The computing system 200 can identify clusters of the mapped data and determine n-dimensional space values for each of the clusters. The clusters represent different data that can be correlated for the corresponding product and thus used to demonstrate, at a particular time, information about the product (e.g., a weight bump when the product is being thrown into a shopping cart at 2 m/s). The clusters can represent projected weight changes over time for the product, which, during runtime, can be compared to expected weight changes over time for the product to validate the product.

Training the model (step B, 222) can include inputting the training data 204 into the model and comparing output from the model to the positive product data correlations 212. Accuracy of the model can be determined based on this comparison and the model can be continuously trained and improved to refine its accuracy.

Once the model is trained (and accuracy of the model is within a predetermined range or threshold level), the model can be outputted (step C, 224). Outputting the model can include storing the model in a data store for future retrieval and runtime use. Outputting the model can also include transmitting the model to one or more controllers 116 of shopping carts 100 and/or mobile devices 112 for local storage and fast deployment during runtime use.

Figure 3:
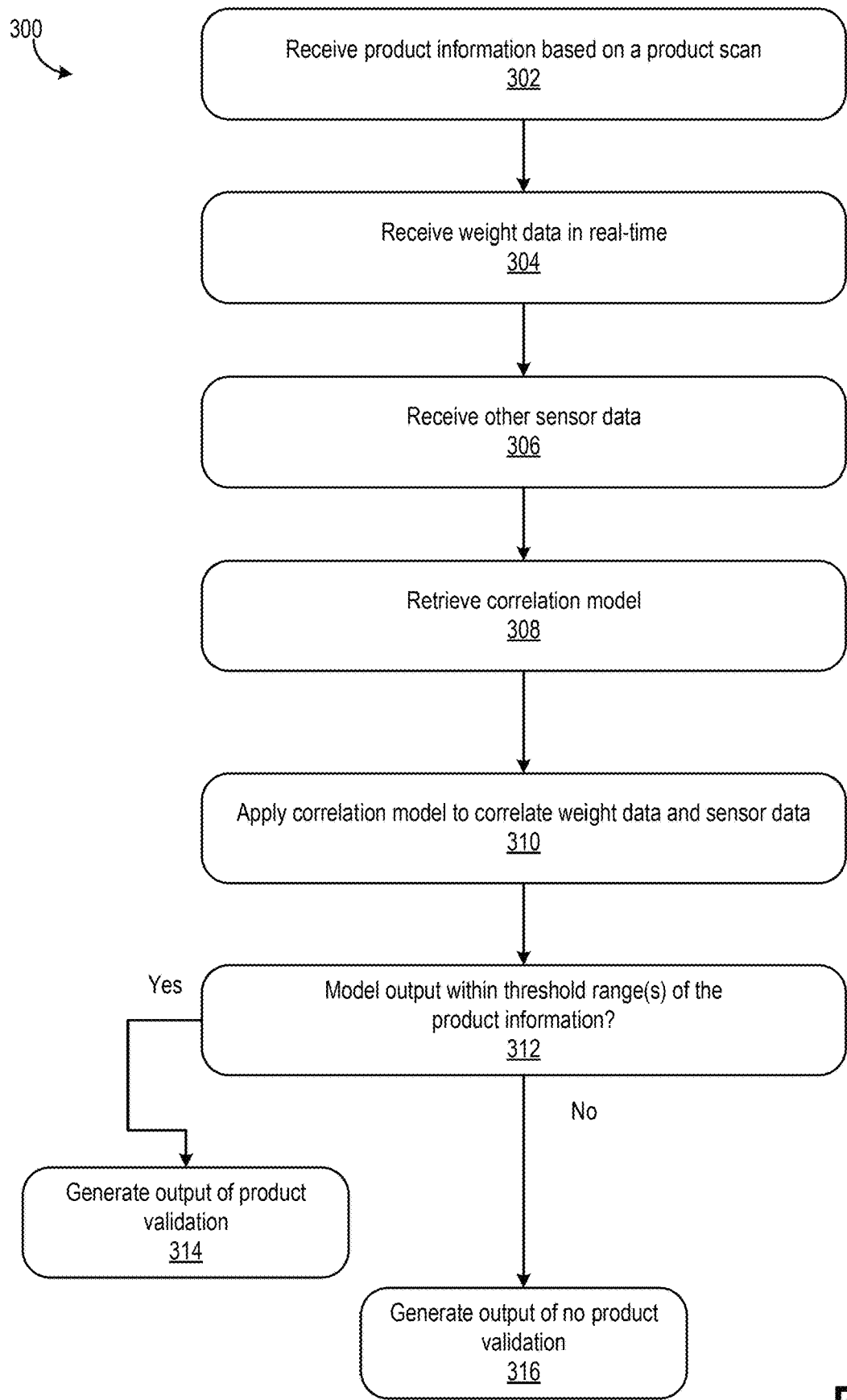
FIG. 3 is a flowchart of a process for using a machine learning model to validate a product.

FIG. 3 is a flowchart of a process 300 for using a machine learning model to validate a product. As described herein, the model can be used to correlate, in real-time, different data signals received of a product being added to a shopping cart. In some implementations, the model can also be trained to compare the correlated data to expected data for the product. The process 300 can be used to validate the product in real-time or near real-time, thereby providing a user with a quick and efficient checkout process with their mobile device.

The process 300 can be performed by the controller 116 of the shopping cart 100 (e.g., refer to FIGS. 1A-B). One or more blocks of the process 300 can be performed by the mobile device 112 of the user, in addition to or instead of the controller 116. Performing the process 300, or one or more blocks of the process 300, at the mobile device 112 can be beneficial to leverage efficient processing power and low power consumption of the mobile device 112. Thus, validation determinations can be made quickly, accurately, and efficiently in real-time or near real-time. In some implementations, one or more blocks of the process 300 can be performed by another computing system, device, network of computers, cloud-based system, and/or cloud-based service. For illustrative purposes, the process 300 is described from the perspective of a controller.

Referring to the process 300 in FIG. 3, the controller can receive product information based on a product scan in 302. As described throughout this disclosure, the product can be scanned by a user at a mobile device. The user can scan the product's barcode or other unique identifier. The mobile device can then use the identifier to retrieve, from a data store, product information associated with the scanned product. The mobile device can then transmit that product information to the controller. In some implementations, the mobile device can transmit the unique identifier for the scanned product to the controller. The controller can then retrieve, from the data store, the product information associated with the scanned product using the unique identifier. In some implementations, where the mobile device performs the product validation process, the mobile device may not transfer the unique identifier or the product information to the controller. Instead, the mobile device can maintain the unique identifier and the product information in local, temporary storage for quick access and retrieval.

The product information received in 302 can include an expected weight of the product and/or one or more expected weight changes over time signatures or curves. The signatures or curves can represent expected weight in a cart when the product is put into the cart at a particular speed/velocity. As described in reference to FIGS. 5A-C, the speed/velocity associated with the expected weight change over time signature(s)/curve(s) can be used to scale weight data associated with the product that is received in real-time. Scaling the real-time weight data can be beneficial to then compare the real-time weight data to the expected weight data for the product to determine whether the product put in the cart matches the scanned product. One or more other product information can be received in 302, including but not limited to shape and volume data.

In 304, the controller can receive weight data in real-time. In some implementations, the controller can continuously poll weight sensor(s) of the cart at predetermined time intervals for changes in weight in the cart. Sometimes, once a product is scanned by the mobile device and the controller receives notification of the scan (such as receiving the product information in 302), the controller can poll the weight sensor(s) for changes in weight in the cart. In some implementations, the weight sensor(s) can detect changes in weight in the cart and automatically transmit those weight changes in real-time to the controller, without a request or poll from the controller.

As described throughout, the weight data can include signatures of weight values detected in real-time in the cart. Weight in the cart can fluctuate over a period of time when a product is added to the cart and until the product settles down in the cart. For example, when a milk carton is put in the cart, the detected weight can fluctuate significantly and potentially for a long period of time because it can take more time for the liquid contents of the milk carton to settle (e.g., the milk in the carton may continue to slosh around for some time, which can cause bumps in the detected weight in the cart). In comparison, if a hollow box is put in the cart, the detected weight can fluctuate less because the weight of the hollow, solid box can settle quickly. Thus, there can be fewer bumps in weight over time for the hollow box than for the milk carton. Moreover, a speed at which the product is put into the cart can also impact the weight values that are detected in real-time. If, for example, the milk carton is thrown into the cart, then the weight data may demonstrate greater fluctuations (e.g., bumps) in weight over a longer period of time than when the milk carton is slowly placed inside the cart. Thus, a combination of weight and motion data can be beneficial to determine whether the product being added to the cart is the same product that was scanned.

The controller can also receive other sensor data (306). Similar to receiving the weight data, the controller can poll other sensors of the cart, such as motion sensors and/or optical flow sensors, for detected data and/or the other sensors can automatically transmit detected data to the controller. The other sensor data can include position translation data of the product relative to the other sensors as the product is moving into the cart, rotational data, motion data, shadow maps, other light signals, RFID signals, etc.

Blocks 302-306 can be performed in any order. For example, the controller can receive the other sensor data (306) at the same time as receiving the weight data (304). The controller can also receive the other sensor data (306) before receiving the weight data (304) and/or before receiving the product information (302). One or more other orders of the blocks 302-306 is also possible. Any of the blocks 302-306 can be performed before, during, or after each other.

The controller can also retrieve a correlation model in 308. The correlation model can be stored in a data store. In some implementations, once the model is trained, it can be deployed to the controller and stored in local storage (e.g., RAM) of the controller for quick retrieval and use during the process 300. The correlation model can be trained by a computing system as described in reference to FIG. 2. As described in FIG. 2, the model can be trained to correlate different, seemingly disparate types of data for a particular product. In some implementations, the controller can retrieve multiple correlation models to use in the process 300.

The controller can then apply the correlation model to correlate the weight data and the sensor data (310). Correlating the weight data and the sensor data can include matching bumps (e.g., fluctuations) in detected weight with changes in position over time of the product as it is added to the cart. As a result, the correlated data can indicate when weight bumps occur based on a speed at which the product enters the cart. In some implementations, as described further in reference to FIGS. 5A-C, correlating the data can include scaling the weight data and/or the other sensor data to a same scale as the expected weight data or other product information.

Figure 5A:
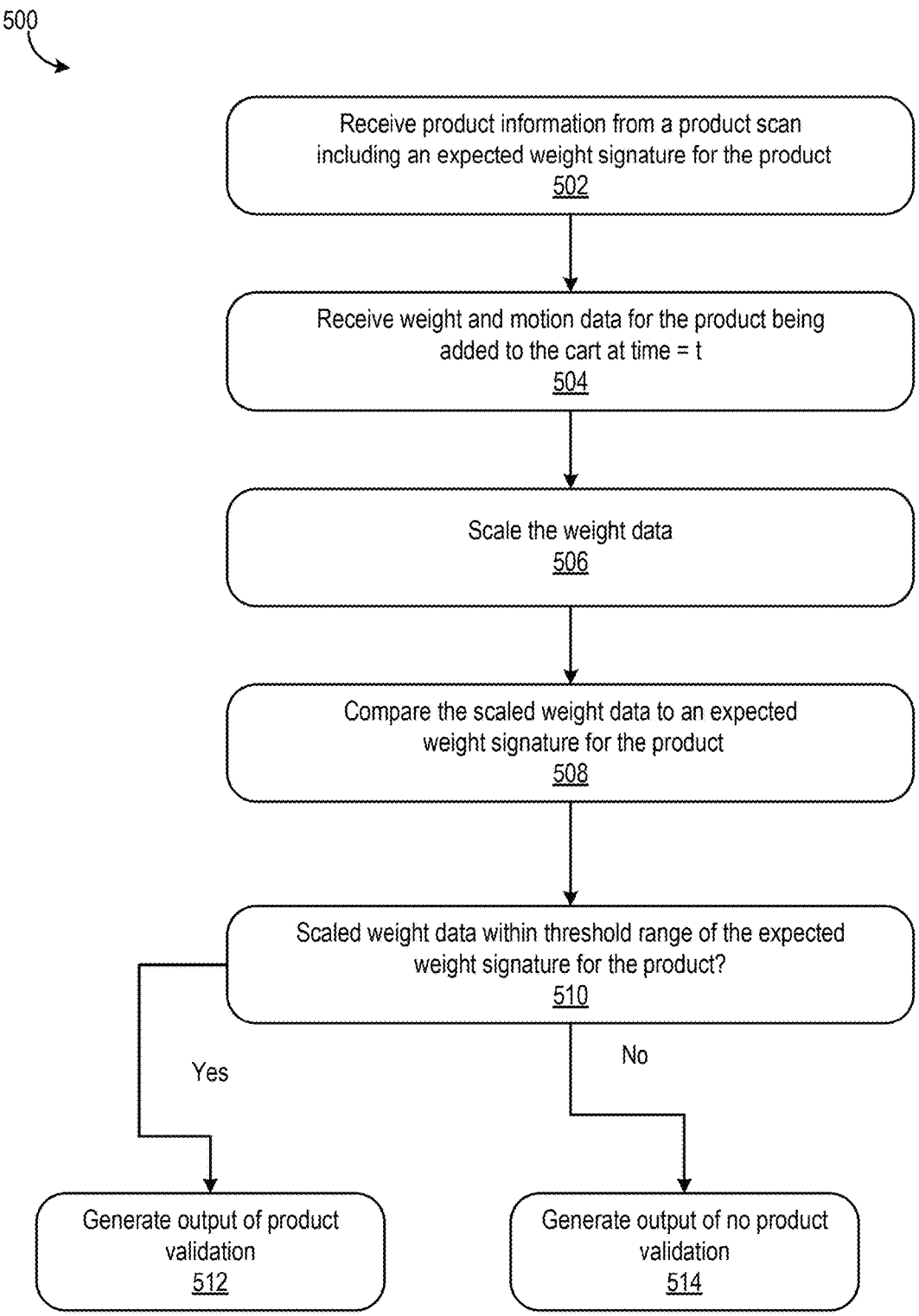
FIG. 5A is a flowchart of a process for validating a product based on analysis of changes in the product's weight signatures over time.
Figure 5B:
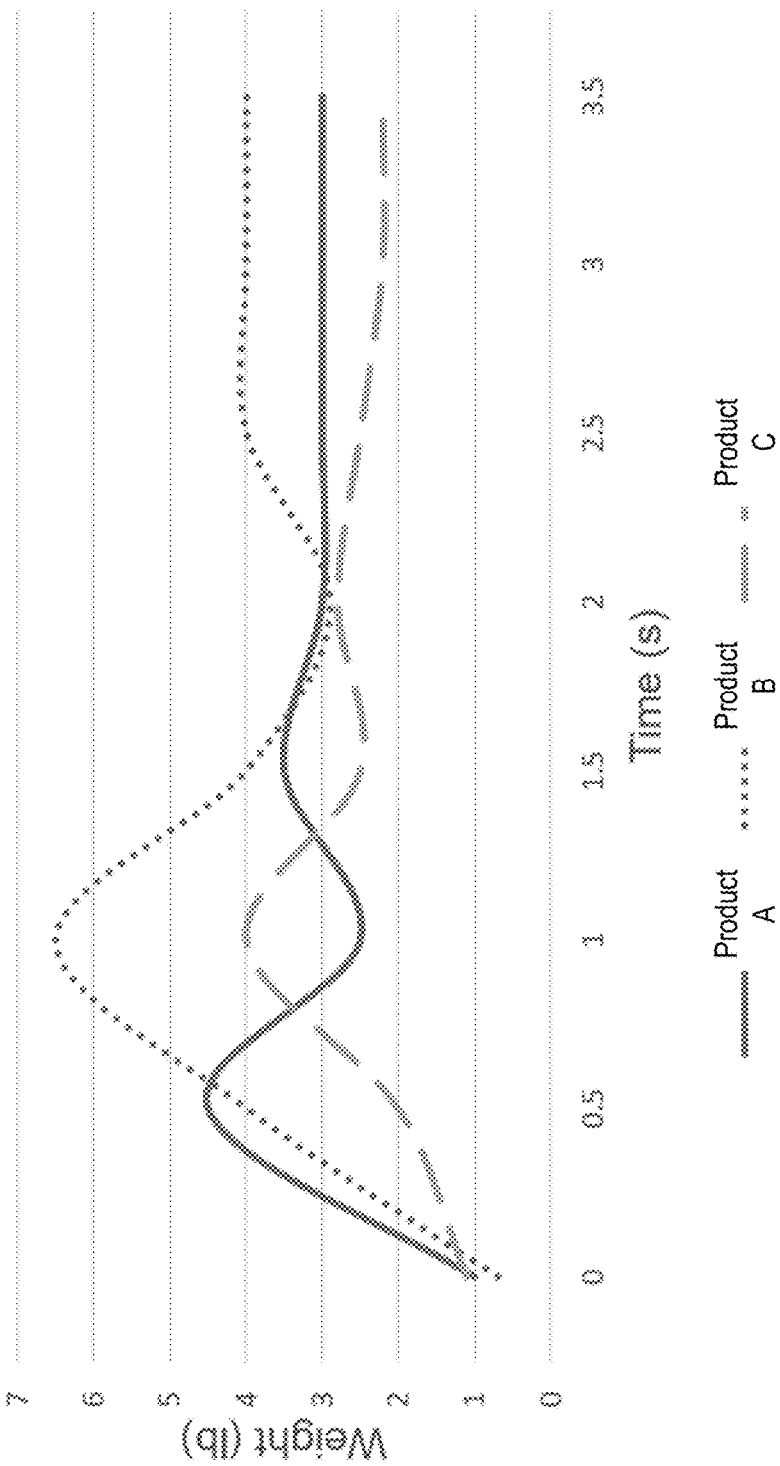
FIG. 5B is a graphical depiction of expected weight signatures for products over time.

The controller can determine whether the model output is within a predetermined threshold range of the product information in 312. For example, the controller can compare a curve or other graphical depiction of the correlated data (e.g., weight change over time, based on speed of the product as the product enters the cart) to a curve or other graphical depiction of the expected weight data for the product. If the curve of the correlated data deviates from the curve of the expected weight data by more than a predetermined threshold amount, then the controller can determine that the product cannot be validated. If, on the other hand, the curve of the correlated data deviates from the curve of the expected weight data by less than the predetermined threshold amount or otherwise is similar or the same, then the controller can determine that the product in the cart matches the scanned product. Refer to FIGS. 5A-C for further discussion.

Accordingly, if the model output is within the predetermined threshold range of the product information, the controller can generate output indicating product validation in 314. The output can include a notification, message, or other form of output to be presented to the user at the mobile device. The output can indicate that the product in the cart matches the scanned product. The output can also prompt the user to continue scanning products and/or to select an option to complete a transaction at the mobile device. In some implementations, the controller may not generate output. Instead, the controller can transmit a notification to the mobile device indicating that the product is validated, which can cause the mobile device to complete a transaction at the mobile device or let the user continue to scan products with the mobile device. One or more other outputs are also possible.

If, on the other hand, the model output is not within the predetermined threshold range of the product information, the controller can generate output indicating that the product is not validated in 316. The output can include a notification, message, or other form of output to be presented to the user at the mobile device. The output can indicate that the product in the cart does not match the scanned product. The output can prompt the user to remove the product from the cart, put the actual scanned product in the cart, and/or scan the product that was originally put in the cart. In some implementations, the output can prevent the user from scanning additional products until the user corrects their mistake.

In some implementations, as described herein, the output can be provided to a computing device of another relevant user, such as retail environment employees. The retail environment employees can review the output and monitor the user. The retail environment employees may intervene and review the contents of the user's cart before the user exits the retail environment. Thus, the retail environment employee can use the output to more accurately and quickly identify product shortages in the retail environment. By doing so, the retail environment employee can readily address the product shortages such that the product shortages do not have a negative impact on shopping experiences of other customers and/or sales for the retail environment.

FIG. 4 is a swimlane diagram of a process 400 for validating a product using the disclosed techniques. Although blocks in the process 400 are shown as being performed by one or more particular components, it is also possible that one or more of the blocks are performed by other components. As an illustrative example, the mobile device 112 can perform product validation (e.g., 424) instead of the controller 116. As another example, correlating data, product validation, and/or generating a notification (e.g., 422-426) can be performed by another computing system, device, remote computer, cloud-based system, and/or cloud based service. Moreover, one or more of the blocks in the process 400 can be performed in one or more different orders. For example, performing a product scan (e.g., 402-406) can be performed at a same time as detecting motion (e.g., 416-418) and/or detecting weight change in the cart (e.g., 410-412). As another illustrative example, performing the product scan (e.g., 402-406) can trigger or cause detection of product motion (e.g., 416-418), and then detection of weight changes in the cart (e.g., 410-412). The blocks of the process 400 can also be performed in one or more other orders.

Referring to the process 400 in FIG. 4, a product scan can be performed at the mobile device 112 (402). Scanning the mobile device can include taking a picture or capturing other image data of the product using an image sensor of the mobile device. The image data can depict a portion of the product having a unique identifier, such as a barcode, SKU, UPC, etc. In 404, the mobile device 112 can retrieve product information using the unique identifier that was captured in the product scan. In some implementations, the controller 116 can retrieve the product information instead of the mobile device 112. The mobile device 112 can transmit the product information to the controller 116 (406), which the controller 116 receives in 408. Refer to FIGS. 1A-B and 3 for further discussion.

The weight sensor(s) 106A-N can detect weight change(s) in the shopping cart (410). The weight sensor(s) 106A-N can transmit the weight change data to the controller 116 (412), which receives the weight change data in 414. As described herein, blocks 410, 412, and/or 414 can be performed before, during, or after blocks 402-408. The weight change data can be transmitted as it is detected by the weight sensor(s) 106A-N in real-time. In some implementations, the weight change data can be transmitted in batches in near real-time. In yet some implementations, the weight change data can be transmitted once weight fluctuations are detected and then settled out for a predetermined period of time (e.g., the weight settles at a value for 3 seconds without fluctuating).

The motion sensor(s) 104A-N can detect product motion data in 416. The motion sensor(s) 104A-N can transmit the product motion data to the controller 116 in 418, and the controller 116 can receive the product motion data in 420. Similar to the blocks 410-414, the blocks 416-420 can be performed before, during, or after any of blocks 402-414. For example, product motion (416) can be detected after a product scan (402) but before detecting weight change in the cart (410). As another example, product motion (416) can be detected at a same time as detected weight change in the cart (410) but before the product information is transmitted to the controller 116 (406). One or more other variations are also possible.

The product motion data can be transmitted as it is detected by the motion sensor(s) 104A-N in real-time. In some implementations, the product motion data can be transmitted in batches in near real-time. In yet some implementations, the product motion data can be transmitted once motion is no longer detected through a top horizontal plane of the cart.

Once the controller 116 receives the product information, weight change data, and product motion data, the controller 116 can correlate the data (422). As described herein (e.g., refer to FIGS. 2-3), the controller 116 can apply one or more machine learning trained models to correlate the received information/data.

The controller 116 can determine whether the correlated data is within threshold range(s) of the product information in 424. If the correlated data is within the threshold range(s) of the product information, the controller 116 can validate the product. In other words, the product put in the cart is likely the same as the product that was scanned by the mobile device 112. Conversely, if the correlated data is not within the threshold range(s) of the product information, the controller 116 may not validate the product; the product put in the cart likely is not the same as the product that was scanned by the mobile device 112.

In some implementations, blocks 422 and/or 424 can be performed by one or more other components, such as the mobile device 112. Performing the blocks 422 and/or 424 at the mobile device 112 can be beneficial to leverage processing power and available compute resources at the mobile device 112. As a result, product validation determinations can be made quickly and efficiently at the mobile device 112.

The controller 116 can then generate a notification about the determination in 426. As described herein, the notification can be a message or other form of output presented to the user of the mobile device 112. The notification can indicate that the product is validated (based on the controller 116 determining in block 424 that the correlated data is within the threshold range(s) of the product information). The notification may also indicate that the product is not validated and that the user should take some action in order to correct the error they made, such as removing the product put in the cart and replacing it with the actual scanned product or scanning the product put in the cart. One or more other notifications are possible, as described throughout this disclosure.

The controller 116 can transmit the notification in 428, which the mobile device 112 can receive in 430. In some implementations, the controller 116 can transmit the notification or other notifications to other computing devices and/or systems, including but not limited to computing devices of retail environment employees.

The mobile device 112 can output the notification in 432. The user can therefore be presented the notification. In some implementations, instead of or in addition to outputting the notification, the mobile device 112 can also perform some action in response to receiving the notification in 430. In other words, the notification can include instructions that, when executed by the mobile device 112, cause the mobile device 112 to perform one or more actions. For example, the instructions can cause the mobile device 112 to update transaction information to reflect a price and quantity of the validated product. In other words, the validated product can be added to the user's transaction (e.g., in a virtual shopping cart) so that the user can purchase that product. As another example, the instructions can cause the mobile device 112 to remove the scanned product information from the transaction if the product is not validated. As yet another example, the instructions can cause the mobile device 112 to complete the transaction by receiving payment information from the user or otherwise processing payment information that the user saved in the application presented at the mobile device 112.

FIG. 5A is a flowchart of a process 500 for validating a product based on analysis of changes in the product's weight signatures over time. Weight measurements can be collected instantaneously as the product is put in a shopping cart and analyzed to identify potential peaks or other sudden changes in weight. The changes in weight can be clustered and may identify different patterns, such as the product hitting an interior side of the cart, contents of the product (e.g., milk in a milk carton) moving around even after the product is already stationary on a bottom surface of the cart, etc. Each of the clusters can be compared to expected weight signatures (e.g., changes) and/or other information (e.g., movement, velocity) about a product that was scanned to determine whether the product added to the cart matches the scanned product (e.g., the expected product). Thus, the process 500 can be used to analyze clusters of weight change data over time to determine product matching (e.g., validation) and/or multiple quantities of the product.

The process 500 can be performed by the controller 116 of the shopping cart 100 (e.g., refer to FIGS. 1A-B). One or more blocks of the process 300 can be performed by the mobile device 112 of the user, in addition to or instead of the controller 116. Performing the process 500, or one or more blocks of the process 500, at the mobile device 112 can be beneficial to leverage efficient processing power and low power consumption of the mobile device 112. Thus, validation determinations can be made quickly, accurately, and efficiently in real-time or near real-time. In some implementations, one or more blocks of the process 500 can be performed by another computing system, device, network of computers, cloud-based system, and/or cloud-based service. For illustrative purposes, the process 500 is described from the perspective of a controller.

Referring to the process 500 in FIG. 5A, the controller can receive product information from a product scan in 502. The product information can include an expected weight signature for the product that was scanned. The expected weight signature can be predetermined for the product and stored in a data store. The expected weight signature can, for example, be derived from prior instances of the product being added to a shopping cart. For example, weight signatures can be collected for the product as the product is added to a shopping cart or different shopping carts at different speeds/velocities, positions, rotations, quantities, etc. These weight signatures can then be graphed and/or scaled to represent a curve of the expected weight change over time. In some implementations, the expected weight signature can be extrapolated based on scaling a known weight of the product using one or more different speeds/velocities or other motion/movement data. Moreover, in some implementations, a weight signature can be broad-based, it can be a range of values for a particular type of product or category of products, and/or it can vary depending on whether the product is a fluid product or a solid product. Sometimes, the weight signature can also vary depending on how different products may interact with the cart when weight in the cart settles out (e.g., a box of nails, although a solid, may settle out similarly to a carton of juice, which is a liquid, since the nails may move around in the box until the weight of the nails settles out just like the juice may move around in the cart until the weight of the juice settles out). Moreover, in some implementations, weight signatures can also vary depending on rattling of items in boxes or other packaging when they are put into the cart (such as pasta in a box or nails in a box). Refer to the processes 300 and 400 in FIGS. 3-4 for additional discussion about weight signatures. As an illustrative example, the weight signatures can vary based on whether the cart is empty or full of one or more different types of items and a new item is put into the cart. Some items may absorb weight or impact of other items as the other items enter the cart, thereby dampening weight signals for the other items. In some implementations, different weight profiles can be generated and used to determine a weight signature for the other items. The weight profiles can indicate different weights and/or characteristics of the cart based on what items are already in the cart. In some implementations, machine learning techniques, algorithms, and/or models can be used to leverage and correlate a variety of parameters about the current state of the cart and the item entering the cart to generate an accurate weight signature for the item entering the cart. The parameters that can be used for training a machine learning model and as input during runtime use of the model can include, for each of the items already in the cart, volume, quantity, fluid/solid characteristics, item weight, and other parameters. In some implementations, when the controller determines a fairly high confidence of a particular item that is added to the cart, the controller can train an existing model or a new model(s) with information about the particular item as well as the parameters about the items already in the cart to then determine a weight signature for the particular item. As a result, training can be performed in an iterative feedback loop in which data is collected about items as they enter carts and used in combination with known information about items already in the carts to improve accuracy of determining weight signatures when the carts may be filled with one or more different types of items.

The controller can receive at least one weight signature for the product being added to the cart at time=t (504). For example, the controller can receive weight data as it is detected in real-time. The controller may also receive multiple weight data collected over a period of time. As a result, the process 500 can be performed in near real-time. At the same time or near the same time as performing block 504, the controller may receive motion data. The motion data can indicate a speed at which the product enters the cart. The motion data can also include position translation data that can be used, by the controller and using trigonometric functions, to determine a speed/velocity of the product as it enters the cart.

In some implementations, the controller can receive the weight data in block 504 and then identify which category of products the product is most likely associated with based on that weight data. For example, the controller can be loaded with a table or other type of data record indicating different product categories and their associated weight ranges. The controller can receive the weight data and compare the weight data to the weight ranges in the table to determine what category the product is likely associated with. The controller can then determine whether the weight data is within a threshold range for that category to then validate whether the product is the actual product that was scanned by the user using the shopping cart. In some implementations, the controller can also determine whether the weight data falls into a general range, threshold range(s), and/or clusters for expected behavior (e.g., weight changes) of products of a particular category and/or type to validate the product. Although such techniques are described as being performed as part of block 504, such techniques can also be performed before, during, after, or instead of one or more other blocks described in the process 500.

The controller can scale the weight data in 506. For example, the weight data can be correlated with the motion data to determine how the weight detected in the cart changed over time. This correlated data can be graphed and represented in a weight change over time curve. However, the weight data collected in real-time may be correlated with a different speed than the expected weight signature for the scanned product. Thus, the weight data collected in real-time (e.g., the weight change over time curve) can be scaled such that it can be examined on a same scale as the expected weight signature for the scanned product. The scaling can be based on the speed at which the expected weight signature is determined.

In 508, the controller can compare the scaled weight data to the expected weight signature for the product. For example, the controller can graph the scaled weigh change over time curve with the excepted weight signature curve. The controller can assess peaks and valleys in the curves and whether such peaks and valleys are close in amplitude, duration, and/or timing. Comparing the two curves can include using calculus or other computational functions to determine timing of inflection points between up and down portions (e.g., peaks and valleys) of the curves, when each curve reaches min and max values, and maximum amplitude values. The controller can compare the two curves based on looking at a particular period of time, such as between t=0 seconds and t=1 seconds. As a result, the controller may not have to wait until more weight change data is collected and available to make a real-time determination of whether the product is validated. In some implementations, the controller can apply one or more machine learning models to compare the scaled weight data to the expected weight signature for the scanned product.

The controller can determine whether the scaled weight signature is within a threshold range of the expected weight signature for the product (510). As described in reference to FIGS. 3-4, the controller can determine how closely the detected weight changes over time aligns with the expected weight signature for the scanned product. The greater the deviation from the expected weight signature, the more likely the product added to the cart does not match the scanned product. The less deviation from the expected weight signature (e.g., deviation that is less than the threshold range), the more likely the product added to the cart matches the scanned product.

Accordingly, if the scaled weight data is within the threshold range of the expected weight signature, the controller can generate output indicating product validation in 512. If, on the other hand, the scaled weight data is not within the threshold range, the controller can generate output indicating that the product was not validated. Refer to FIGS. 3-4 for additional discussion on the output.

FIG. 5B is a graphical depiction 520 of real-time weight signatures for products that are added to a shopping cart. The graph 520 represents curves for three products: A, B, and C. In some implementations, as described in reference to FIG. 5A, a product can be added to an empty cart. The weight data collected can therefore be associate with a single product. The three product weight signatures shown in FIG. 5B may not all be detected/received at the same time. For example, when weight change is detected in the cart, the controller may only receive the detected weight signature for a most recent product that was scanned by the user at the user's mobile device.

As shown in the graph 520, the curves for each of the products A, B, and C can fluctuate depending on their respective weights, contents, and speeds at which they enter or entered the cart. The curves can spike up when first entering the cart, can hit one or more valleys, and can eventually level out to a constant weight or balancing point (e.g., once contents of the product have stopped moving around). The higher the speed and/or force at which the product enters the cart, the higher the peaks in the curve and/or the greater the valleys. Thus, the product curve may exhibit larger amplitudes.

Since the curves can vary depending on the speed at which the products enter the cart, each of the curves can be scaled (e.g., normalized) linearly and/or algorithmically. The curves can be adjusted to be more easily assessed against expected weight signatures. In some implementations, scaling the curves can include taking a predetermined multiplier (e.g., 2×, 10×, etc.) and multiplying the amplitude of the curves by the multiplier. In some implementations, scaling the curves can include multiplying the amplitudes by the detected/determined velocity at which the products enter the cart. Thus, the curves can be adjusted to match velocity. The curves can also be adjusted by downscaling their amplitudes to the expected weight signatures philosophies. As a result of scaling the curves, the detected weight changes can be more accurately compared to the expected weight changes of the scanned product.

FIG. 5C illustrate graphical depictions 530 and 540 comparing the expected weight signatures with actual weight signatures for the products. In particular, the graph 530 depicts the detected weight changes over time for product A against the expected weight signatures for the scanned product A. The graph 540 depicts the detected weight changes over time for product B against the expected weight signatures for the scanned product B. Once the detected weight changes for the product A are scaled and normalized to match scaling of the expected weight signature for the scanned product in the graph 530, it can be determined (e.g., by the controller 116 and/or the mobile device 112) that the product A matches the scanned product. In other words, the product is validated.

The disclosed techniques can provide for instantaneous product validation rather than waiting for the weight of the detected product to completely balance or level out (e.g., at 2 seconds in the graph 530). Instead, product validation can be performed using a portion of the detected weight data, such as weight change that is detected between t=0 and t=1 second. Weight change detected between t=0 and t=1 can be compared to the expected weight signature for the scanned product between t=0 and t=1.

In the example graph 530, the weight change between t=0 and t=1 for the product A very closely matches the expected weight signature between t=0 and t=1. The weight change curve of product A can be within a predetermined threshold range of the expected weight change curve for the scanned product. Accordingly, the product A can be validated and likely matching the scanned product.

In comparison, in the example graph 540, the weight change between t=0 and t=1 for product B does not closely match the expected weight signature between t=0 and t=1 for the scanned product. The weight change curve of product B may not be within a predetermined threshold range of the expected weight change curve for the scanned product. After all, the expected weight signature for the scanned product indicates that at approximately 0.5 seconds, the weight change would hit its peak and that by 1 second, the weight change would be declining. The detected weight change of product B indicates that at approximately 0.5 seconds, the weight change is still increasing and the product B does not hit a peak in weight change until a little after 1 second. Moreover, the amplitude of product B at its detected weight change peak around 1 second is approximately 1.2× higher than the expected amplitude for the scanned product at around 0.5 seconds. Accordingly, product B may not be validated. Based on the detected weight change associated with product B, the product added to the cart, product B likely does not match the product that was scanned by the user at the mobile device.

Figure 6:
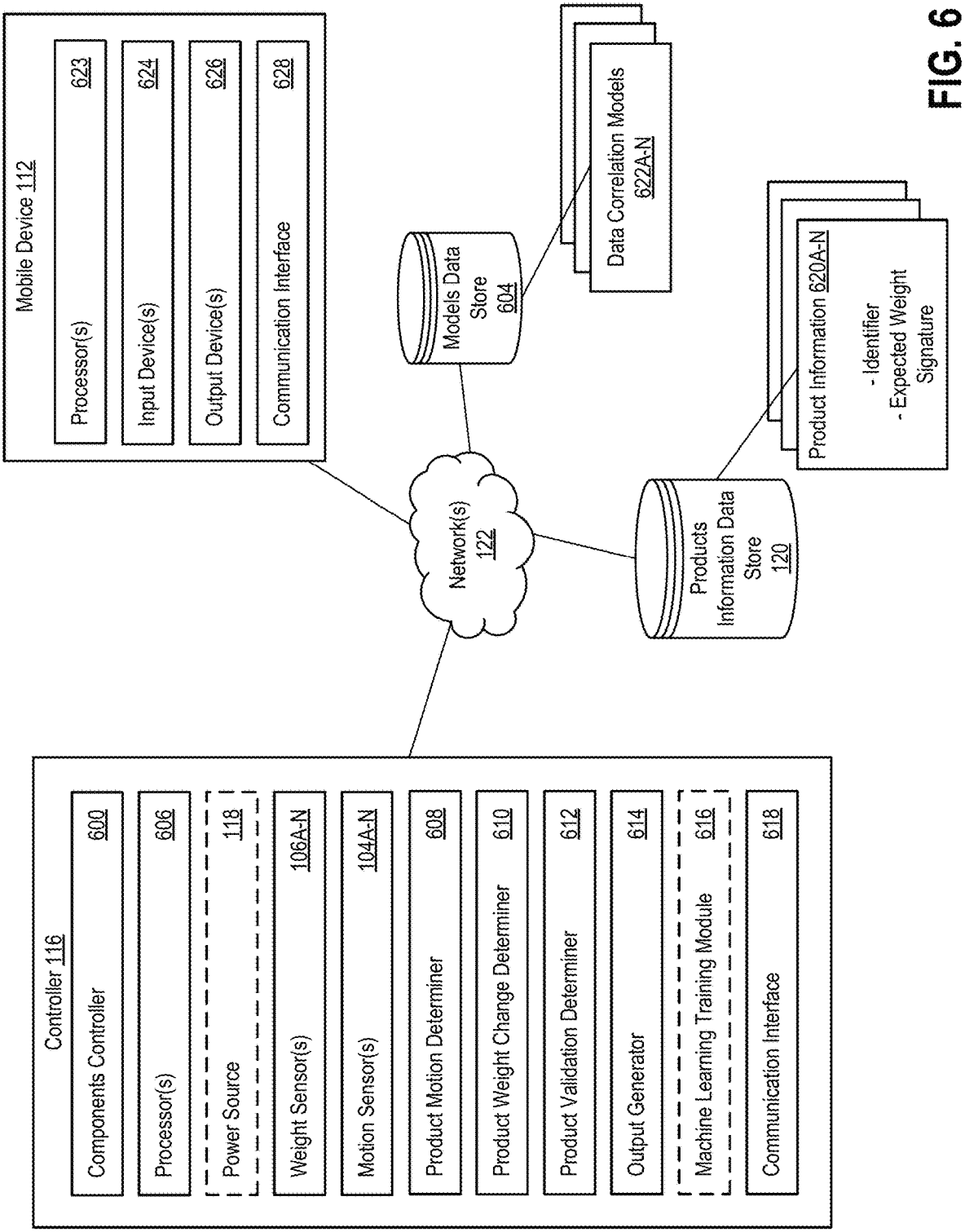
FIG. 6 is a system diagram depicting components that can be used to perform the techniques described herein.

FIG. 6 is a system diagram depicting components that can be used to perform the techniques described herein. As described herein, the controller 116, mobile device 112, products information data store 120, and a models data store 604 can communicate (e.g., wirelessly, wired, Bluetooth, LAN, etc.) via the network(s) 122. In some implementations, one or more of the components described herein can be integrated or otherwise part of a same system, network, computer, and/or device.

The mobile device 112 can be configured to provide a graphical user interface (GUI) application for users to use and improve their shopping experiences in a retail environment. The mobile device 112 can include processor(s) 623, input device(s) 624, output device(s) 626, and a communication interface 628. The processor(s) 623 can be configured to executed instructions that cause the mobile device 112 to perform one or more of the functions, processes, and/or techniques described herein. As an illustrative example, the instructions can cause the mobile device 112 to perform the functions of a product validation determiner 612 of the controller 116. Performing such functions at the mobile device 112 can be beneficial to leverage efficient and light processing power and compute resources at the mobile device 112.

The input device(s) 624 can include any types of input devices, including but not limited to touchscreen displays, screens, keyboards, mice, cameras, other image sensors, and/or microphones. The input device(s) 624 can receive input from the user of the mobile device 112. The user can provide input such as scanning a product with a camera of the mobile device 112. The mobile device 112, via the processor(s) 623, can process the image from the scan to identify a unique identifier of the product. The unique identifier can then be used to retrieve corresponding product information 620A-N from the products information data store 120. In some implementations, the mobile device 112 can retrieve the product information 620A-N from the data store 120. In some implementations, the mobile device 112 can transmit the unique identifier to the controller 116 (e.g., the product validation determiner 612), which can then retrieve the product information 620A-N from the data store 120.

The product information 620A-N can include the identifier associated with the scanned product and an expected weight signature for the scanned product. The product information 620A-N can also include one or more additional data and/or information about the scanned product, including but not limited to supplier/vendor information, discounts, promotional offers, and/or other information about the scanned product. The user can also provide other input to the mobile device 112 using the input device(s) 624 including but not limited to selection of promotions, discounts, and/or quantities of a product the user wishes to purchase. The user input can also include selecting an option to perform a checkout process and complete a current transaction at the mobile device 112. One or more other types of input are also possible.

The output device(s) 626 can present information to the user in a GUI application. The output device(s) 626 can include touchscreen displays, other display screens, speakers, etc. The presented information can include selectable options to view products added to a current transaction (e.g., products in a virtual shopping cart), products that have been scanned, recommended products that the user can add to the transaction, promotions, offers, or other discounts to apply to the transaction, and/or a product search interface. One or more other information can be presented to the user via the output device(s) 626 of the mobile device 112.

The communication interface 628 can provide communication between components of the mobile device 112 and one or more other components described herein.

The controller 116 can perform one or more of the functions, processes, and techniques described herein. In some implementations, one or more other components, such as the mobile device 112 can perform one or more functions, processes, and/or techniques of the controller 116. As described throughout this disclosure, each shopping cart in a retail environment can include the controller 116. In some implementations, some shopping carts may include the controllers 116 and other shopping carts may not include the controllers 116. Shopping carts that do not include the controllers 116 can be in communication with the mobile device 112 and/or remote computing systems, networks, cloud-based systems, cloud-based services, and/or other devices.

The controller 116 can include a components controller 600, processor(s) 606, optional power source 118, weight sensor(s) 106A-N, motion sensor(s) 104A-N, product motion determiner 608, product weight change determiner 610, product validation determiner 612, output generator 614, optional machine learning training module 616, and communication interface 618.

The components controller 600 can control hardware of the shopping cart. For example, the components controller 600 can activate one or more of the weight sensors 106A-N and/or the motion sensors 104A-N of the cart. In implementations where the cart includes additional sensors, such as RFID readers and/or lights, the components controller 600 can control one or more of the additional sensors to activate and/or detect/collect data. In some implementations, the components controller 600 can poll the weight sensors 106A-N and/or the motion sensors 104A-N for recently detected weight and/or motion signals or changes in weight and/or motion signals. The components controller 600 can also poll the additional sensors in the cart for detected signals.

The processor(s) 606 can be configured to perform one or more of the operations, techniques, and/or processes described herein. The processor(s) 606 can receive instructions, that when executed, cause one or more particular components of the controller 116 to perform the operations, techniques, and/or processes described herein.

The power source 118, as described in relation to FIG. 1A, can be optional. For example, the power source 118 can be part of the shopping cart and may supply power to components of the cart, including but not limited to the controller 116, the components controller 600, the weight sensors 106A-N, the motion sensors 104A-N, and/or any additional sensors. In some implementations, one or more of the components described herein can include their own power sources. The power source 118 can be a battery (e.g., rechargeable). One or more other types of power sources 118 can also be used.

The weight sensor(s) 106A-N, as described in reference to FIG. 1A, can be integrated into a basket of the shopping cart. In some implementations, the cart may have one weight sensor 106A positioned at a bottom of the basket. In some implementations, the cart may have multiple weight sensors 106A spread out (e.g., in a grid layout) across the bottom of the basket. Moreover, in some implementations, one or more sides of the basket may also include weight sensor(s) 106A-N. The weight sensor(s) 106A-N can be configured to detect real-time changes in weight in the cart when products are added to the cart. The weight sensor(s) 106A-N can automatically transmit, in real-time, detected weight data to components such as the product weight change determiner 610 (e.g., as the weight data changes are detected). The weight sensor(s) 106A-N may also transmit the weight data at predetermined time intervals and/or upon being polled by the components controller 600.

In some implementations, the weight sensor(s) 106A-N may not be triggered (e.g., by the components controller 600 or automatically) to detect weight changes until a product is scanned at the mobile device 112. Thus, the mobile device 112 can transmit a notification to the controller 116 indicating that a product scan was performed. One or more components of the controller 116 can then be activated.

The motion sensor(s) 104A-N, as described in reference to FIG. 1A, can be integrated into the basket of the shopping cart. One or more motion sensor(s) 104A-N can be positioned at predetermined distances around a top perimeter of the basket of the cart. As a result, the motion sensor(s) 104A-N can detect movement near a top horizontal plane of the shopping cart, which can indicate a product as it initially enters the cart. One or more motion sensor(s) 104A-N can also be positioned along sides of the basket (e.g., interior sides of the basket) that can also detect motion of the product once it is entering the cart. The motion sensor(s) 104A-N can detect real-time changes in position, motion, movement, and/or rotation of products as they are added to (or removed from) the cart. The motion sensor(s) 104A-N can automatically transmit, in real-time, detected motion data to components such as the product motion determiner 608 (e.g., as the motion data is detected). The motion sensor(s) 104A-N may also transmit the motion data at predetermined time intervals and/or upon being polled by the components controller 600.

Like the weight sensor(s) 106A-N, in some implementations, the motion sensor(s) 104A-N may not be triggered (e.g., by the components controller 600 or automatically) to detect motion data until the product is scanned at the mobile device 112. Thus, the mobile device 112 can transmit a notification to the controller 116 indicating that a product scan was performed. One or more components of the controller 116 can then be activated. Moreover, the motion sensor(s) 104A-N can be activated before the weight sensor(s) 106A-N. For example, the motion sensor(s) 104A-N positioned at the top perimeter of the cart may detect movement at the top horizontal plane of the cart before any weight change can be detected deeper inside the basket of the cart. Therefore, in some implementations, the weight sensor(s) 106A-N may not be triggered (e.g., by the components controller 600 or automatically) until motion is detected by the motion sensor(s) 104A-N.

The product motion determiner 608 can be configured to determine a speed (e.g., velocity) of the product that is added to the cart. The determiner 608 can receive motion data from the motion sensor(s) 104A-N. The determiner 608 can use trigonometric functions to translate the motion data (e.g., position translation data, rotation data, movement data, etc.) into the speed of the product.

The product weight change determiner 610 can be configured to determine a weight change over time for the product that is added to the cart. The determiner 610 can receive the weight data from the weight sensor(s) 106A-N. The determiner 610 can also receive the determined speed (e.g., velocity) for the product from the product motion determiner 608. The product weight change determiner 610 can then correlate the received data to determine how the weight changes over a period of time for the particular product. The determiner 610 can, for example, generate a curve for the product that depicts weight change over time for the product. In some implementations, the determiner 610 can retrieve one or more data correlation models 622A-N from the models data store 604. The determiner 610 can apply the retrieved models 622A-N to correlate the weight data with the motion data.

The product validation determiner 612 can be configured to determine whether the weight change over time for the product added to the cart matches or is similar to an expected weight signature for a product that is scanned by the mobile device 112. The product validation determiner 612 can receive the weight change over time for the product from the product weight change determiner 610. The determiner 612 can also receive the product information 620A-N for the product that is scanned by the mobile device 112. For example, the mobile device 112 can retrieve the product information 620A-N from the data store 120 using the unique identifier of the product from the scan. As another example, the mobile device 112 can transmit the unique identifier to the product validation determiner 612 and the determiner 612 can retrieve the expected weight signature in the product information 620A-N for the scanned product.

As described throughout this disclosure, the product validation determiner 612 can compare the weight change over time for the product added to the cart to the expected weight signature for the scanned product. The determiner 612 can identify how much the weight change of the added product deviates from the expected weight signature for the scanned product. The determiner 612 can determine whether this deviation is within one or more predetermined threshold ranges. If the deviation is within the predetermined threshold ranges, the determiner 612 can validate the product. In other words, the product added to the cart likely matches the product that was scanned by the mobile device 112. If, on the other hand, the deviation is not within the predetermined threshold ranges, the determiner 612 may not validate the product—the product added to the cart likely does not match the product that was scanned by the mobile device 122. As described herein, determinations made by the product validation determiner 612 can also be performed locally by the processor(s) 623 of the mobile device 112.

The output generator 614 can receive the validation determination from the product validation determiner 612. The output generator 614 can generate output to be presented to at least the user at the mobile device 112 based on the validation determination. The output generator 614 can also generate output to be presented to at least one other relevant user at a computing device, such as a retail environment employee. Refer to FIGS. 1B, 3-5A for additional discussion about the output generator 614.

The machine learning training module 616 can be optional. The module 616 can be configured to train the data correlation models 622A-N and store the models 622A-N in the models data store 604. Refer to FIG. 2 for additional discussion about training the models 622A-N. In some implementations, the controller 116 may not include the machine learning training module 616. Instead, the module 616 can be part of another device, computing system, network, cloud-based system, and/or cloud-based service. For example, the module 616 can be part of a retail environment computing system. The module 616 can also be part of a cloud-based service that is deployed and used in a network of retail environments. As a result, training can be remote from the other components described herein and/or operation of such components.

Finally, the communication interface 618 can provide for communication amongst the components of the controller 116 and one or more other components described in FIG. 6.

Figure 7:
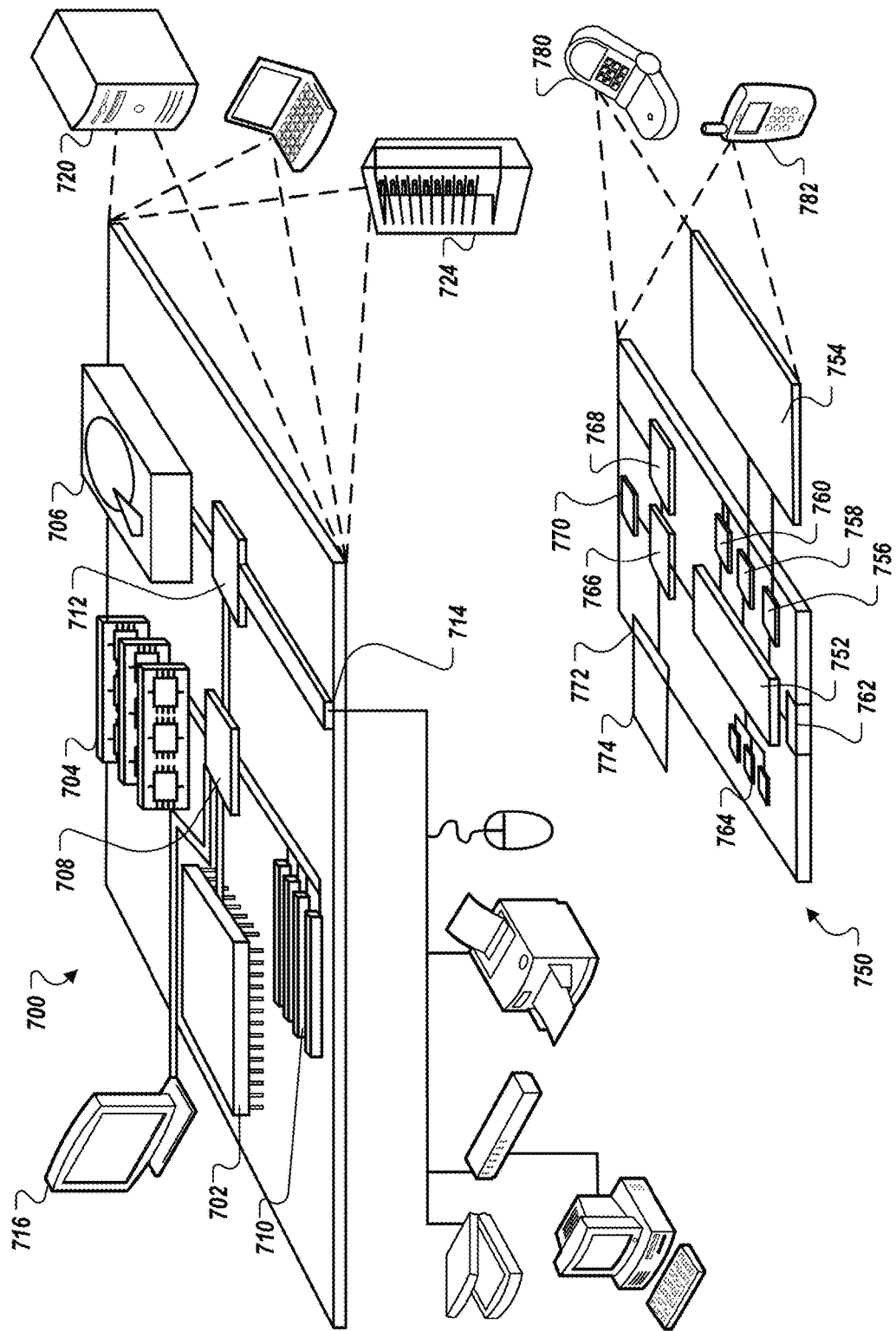
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 8:
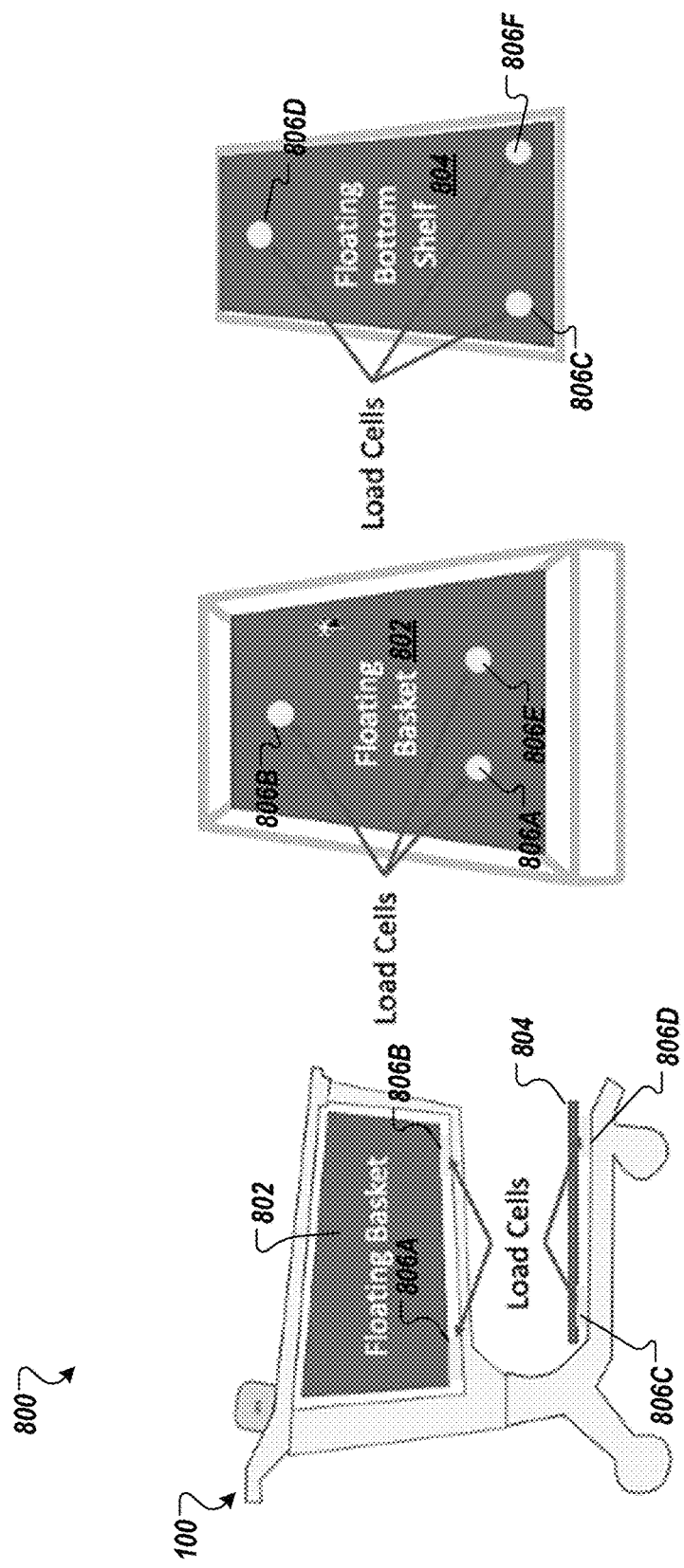
FIG. 8 illustrates an example configuration of load cells in the shopping cart described herein.

FIG. 8 illustrates an example configuration 800 of load cells 806A-F in the shopping cart 100 described herein. Detections made by the load cells 806A-F can be used for quick and efficient detection of a quantity of sudden weight changes in the cart 100 as products are added and/or removed from the cart 100. Detections made by the load cells 806A-F can also be used to accurately determine changes in weight once the products added to or removed from the cart 100 have settled (e.g., milk inside a milk carton that was added to the cart 100 stops sloshing around inside the milk carton). Moreover, detections made by the load cells 806A-F can be used to determine an expected weight for a given product and quantity of the product that is added to the cart 100, as described throughout this disclosure.

As shown in FIG. 8, the shopping cart 100 can include one or more load cells 806A-F. In some implementations, as described herein, the shopping cart 100 can include one or more other types of pressure and/or weight sensors or a combination of one or more other types of pressure and/or weight sensors. The shopping cart 100 can include a basket 802 and a bottom shelf 804. In the configuration 800, load cells 806A, 806B, and 806E can be positioned in such a way within the basket 802 (e.g., along a bottom surface of the basket 802, along sides of the basket 802, etc.) to form a triangle configuration. The load cells 806A, 806B, and 806E can be configured to detect weight changes as described throughout this disclosure. Similarly, load cells 806C, 806D, and 806F can be positioned in such a way on the bottom shelf 804 (e.g., along a surface of the bottom shelf 804) to form a triangle configuration. The load cells 806C, 806D, and 806F can be configured to detect changes in weight on the bottom shelf 804, which can indicate that a customer put one or more products on the bottom shelf 804. After all, sometimes customers may forget that they placed products on the bottom shelf 804, and the load cells 806C, 806D, and 806F can be used to detect that products are in fact placed thereon. The triangle configurations can be beneficial to balance out load detections that are made by the load cells 806A-F in the respective basket 802 and bottom shelf 804. As a result, accurate weight readings can be detected and determined in the cart 100.

In some implementations, one or more load cells can also be positioned in or along legs or posts of the cart 100, such as the posts closest to a handle of the cart 100. Moreover, in some implementations, the basket 802 can be a floating basket and the bottom shelf 804 can be a floating bottom shelf. With the floating basket and floating bottom shelf, structural posts (e.g., legs) of the cart 100 can extend down to wheels of the cart 100 such that weight or pushing applied to the handle of the cart 100 may not affect or change load or weight detections in the basket 802 and/or on the bottom shelf 804.

Figure 9:
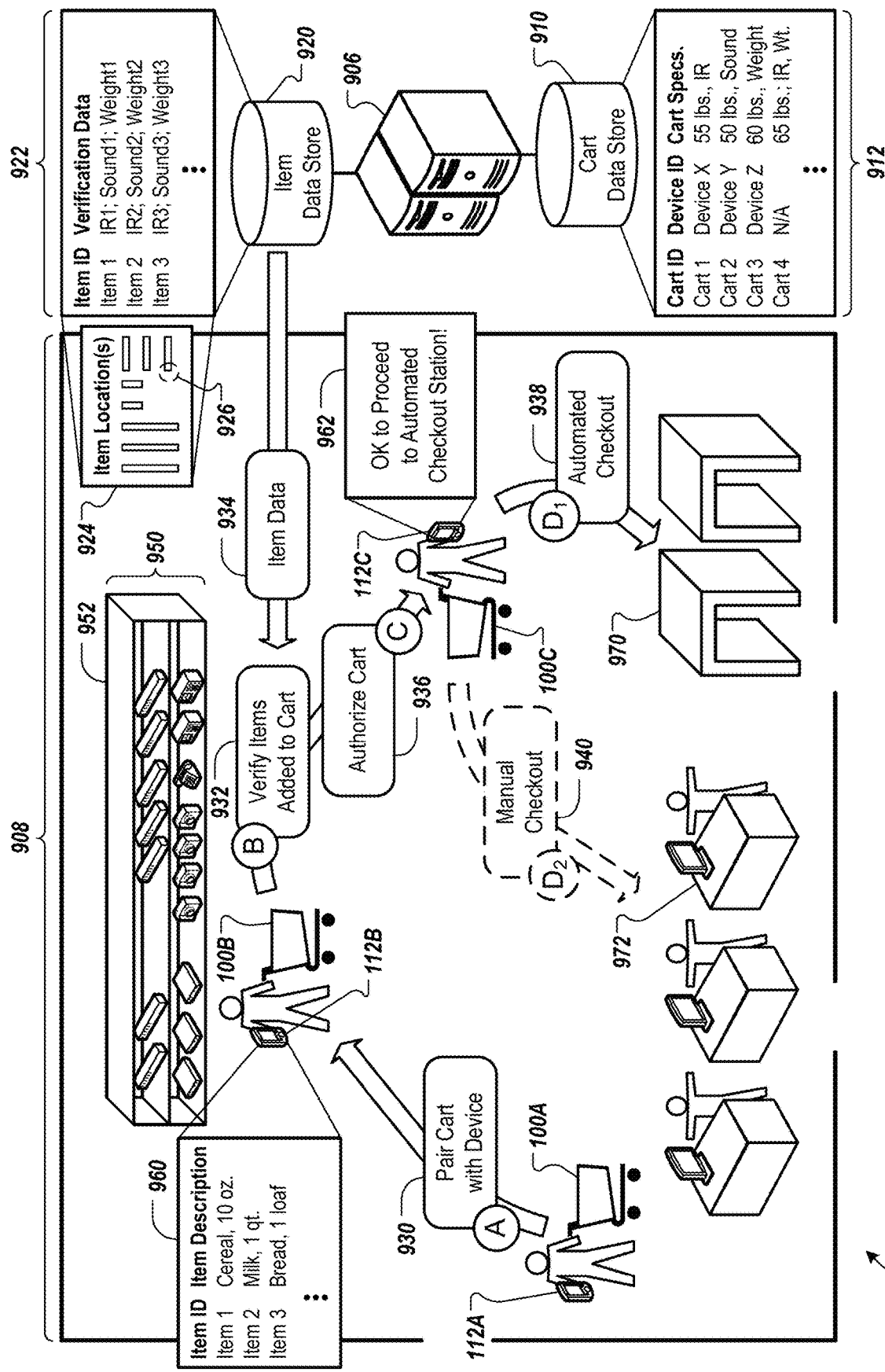
FIG. 9 is a conceptual drawing of an example retail environment, and an example system for verifying items placed in physical shopping carts.

FIG. 9 is a conceptual drawing of an example shopping environment 908, and an example system 900 for verifying items placed in physical shopping carts, as represented in example stages (A) to (D). Stages (A) to (D), for example, may occur in the illustrated sequence, a different sequence, and/or two or more stages (A) to (D) may be concurrent. In some examples, one or more stages (A) to (D) may be repeated multiple times during a shopping trip.

The shopping environment 908 can be a physical retail store, warehouse, or another sort of facility in which various items 950 (e.g., physical products) are stored in various storage units 152 (e.g., shelves, racks, bins, etc.) and are available for selection by various system users (e.g., customers, employees, or other system users). In general, each system user can employ a respective personal mobile device and a respective shopping cart while traversing the shopping environment 908 and adding items to their cart. In the present example, a system user employs mobile device 102 (e.g., a smart phone, a digital assistant, a tablet, or another sort of mobile computing device) and shopping cart 104 (e.g., a smart cart, a dolly cart, a shopping basket, or another sort of manually operated or self-guided physical device for conveying items, that includes various computing components and physical sensors) while shopping. The mobile device 102, for example, can communicate with the shopping cart 104 and with a server system 106 during the user's shopping trip. The server system 106, for example, can include and/or communicate with one or more computing servers (e.g., application servers, cloud servers, data servers, etc.). As described in further detail in examples below, communication between the various devices and systems may occur over a communication network and/or may occur over a direct connection.

During stage (A), a shopping cart is paired with a user's mobile computing device. For example, the system 900 can perform operation 130, pairing shopping cart 104 (shown here as cart 104a) with mobile device 102 (shown here as device 102a). Pairing the cart 104 with the mobile device 102, for example, can be initiated when the device 102 detects an identifier of the cart 104, which can be performed by the device 102 in a variety of ways. For example, the user of the mobile device 102 can select an option to scan a cart identifier (e.g., a barcode, a QR code, etc.) on the cart 104, using a mobile application running on the device 102, and can then capture an image of the cart identifier (e.g., using a device camera). As another example, the user of the mobile device 102 can select an option to wirelessly obtain the cart identifier, using the mobile application, and can then follow instructions presented by the mobile application regarding how to position the device 102 relative to the cart 104 to obtain the cart identifier wirelessly. In some implementations, wirelessly obtaining a cart identifier by a mobile computing device can include establishing a local wireless network between the device (e.g., mobile device 102) and a cart (e.g., cart 104). The local network, for example, can be any of a variety of communication networks between the mobile device 102 and the shopping cart 104, such as a WiFi Direct connection, a BLUETOOTH pairing (e.g., BLE pairing), an NFC connection, and/or connections to a common local wireless network (e.g., both the mobile device 102 and the cart 104 being connected to the same WiFi network). Other options for obtaining the cart identifier by the mobile device 102 are also possible. For example, the cart identifier can be obtained by establishing a wired connection between the mobile device 102 and the cart 104 (e.g., a tethered connection, such as a wired USB connection).

Once the cart identifier has been obtained, the mobile device 102 can transmit a cart association request to the server system 106 (e.g., through a WiFi network, or another suitable network of the retail environment 908). The cart association request, for example, can include the obtained cart identifier of the shopping cart 104, and can include information that uniquely identifies the mobile device 102.

In response to receiving the cart association request, for example, the server system 106 can update cart data 112 in a cart data store 110 (e.g., a data server, a file system, or another suitable type of data storage device or system) to include data that associates the shopping cart 104 with the mobile device 102. In the present example, the cart data store 110 can include additional shopping cart specifications, such as a weight of a cart, and types of item verification sensors that may exist on the cart (e.g., infrared (IR) sensors, sound sensors, weight sensors, cameras, or other suitable sensors). Such additional information can be used by the system 900 to facilitate verification of items being added to the shopping carts and/or a final verification of cart contents, as described in further examples below.

During stage (B), items added to a shopping cart are verified. For example, the system 900 can perform operation 132, in which operations of the mobile device 102 (shown here as device 102b), the shopping cart 104 (shown here as cart 104b), and the server system 106 are coordinated to verify one or more items 950 as the items are added to the cart 100. A user can select one or more of the items 950 from its storage unit 952, for example, and can scan the item(s) with the mobile device 112, using a mobile application (e.g., a shopping application) running on the device 112. Item scanning, for example, can be performed by capturing an image of an identifier of a selected item (e.g., a barcode, a QR code, etc.) using a camera of the mobile device 112, by scanning a Radio Frequency Identification (RFID) tag of the selected item using an RFID scanner of the mobile device 112, or by performing another sort of item scan.

Once the item identifier has been obtained (and optionally, once an item quantity has been specified by the user), the mobile device 112 can transmit an item data request to the server system 106 (e.g., through a WiFi network, or another suitable network of the retail environment 908). The item data request, for example, can include the obtained item identifier of a selected item 950. In response to receiving the item data request, for example, A server system 906 can access an item data store 920 (e.g., a data server, a file system, or another suitable type of data storage device or system) that can include, in association with unique identifiers for various types of items (e.g., products in the retail environment 908), item data 922 for the items. The item data 922, for example, can include various types of item verification data for each item, each type of item verification data corresponding to a different type of item verification sensor that may exist on a shopping cart (e.g., infrared (IR) sensors, sound sensors, weight sensors, cameras, or other suitable sensors). In addition to the item verification data, for example, the item data 922 can include other item data in association with an item identifier, such as an item price, an item description, an item weight, an image of the item, one or more known locations of the item in the retail environment 908 according to a planogram and/or a heat map, etc. In the present example, the server system retrieves and provides item data 934 (e.g., including some or all of the item verification data and other item data that pertains to the selected item 950) to the mobile device 112 and/or the shopping cart 100, from the item data store 920.

In some implementations, retrieving and providing item verification data can be based at least in part on shopping cart specifications of a shopping cart that is paired with a mobile device that requested the data. For example, the item data request can include, along with the obtained item identifier of the selected item 950, an identifier of the shopping cart 100 that is paired with the mobile device 112, and/or an identifier of the device 112. Upon receiving the identifier of the shopping cart 100 and/or the identifier of the device 112, for example, the server system 906 can access a cart data store 910 and retrieve (and optionally, cache for later use) shopping cart specifications that correspond to the shopping cart 100. As another option, the mobile device 112 can provide the server system 906 with the shopping cart specifications that correspond to the paired shopping cart 100 as part of the item data request. After receiving the shopping cart specifications for the shopping cart 100 (e.g., including data that indicates each type of sensor that exists on the cart), for example, the server system 906 can retrieve and provide item verification data that corresponds to the selected item 950 and to the types of item verification sensors that exist on the cart 100. By retrieving and providing verification data that pertains to a particular cart, for example, an amount of data transmitted over the network(s) can be reduced, along with data transmission times.

In some implementations, retrieving and providing item verification data (and optionally, other item data) for an item can be performed without the item having been scanned. For example, the mobile device 112 can be associated with a user account that has a historical purchase history maintained by the server system 906. When the mobile device 112 and the shopping cart 100 are paired, for example, the server system 906 can retrieve and provide item verification data (and optionally, other item data) that pertains to a subset of the items 950 that have been frequently purchased by the user, based on the historical purchase history associated with the user's account. As another example, as the mobile device 112 moves throughout the retail environment 908, device location information (e.g., based on wireless signal strength data, Global Positioning System (GPS) data, or other suitable data) can be provided to the server system 906. In response to receiving the device location information, for example, the server system 906 can retrieve and provide item verification data (and optionally, other information) that pertains to a subset of the items 950 that are in proximity to the mobile device 112 (e.g., based on item location information maintained in the item data store 920).

By using the server system 906 to retrieve and provide verification data (and optionally, other item data) as the data is used (and/or, in anticipation of the data being used), data updates can be centrally managed. For example, the retail environment 908 may include tens of thousands of different types of items 950, and the relevant verification data and other product information for such items can change over time. When changes occur, for example, the item data store 920 and/or the cart data store 910 can be updated, and the mobile device 112 and/or the shopping cart 100 can receive current data for particular items upon request. Thus, the data storage requirements of both the mobile device 112 and the shopping cart 100 can be reduced, along with an amount of data transmitted over the network(s).

Once the item data 934 has been retrieved and provided by the server system 906, for example, the mobile device 112 and/or the shopping cart 100 can receive the data 934, and can use the data 934 to verify whether the item 950 scanned by the mobile device 112 is actually added to the cart 100, according to item verification sensors of the cart 100. In general, item verification data of a particular type can be used by item verification sensors of a corresponding type to verify an item. For example, infrared (IR) verification data (e.g., data that defines a size/shape of an item, as detected by IR sensors when the item enters the cart 100) can be used to verify the item 950 according to the shopping cart's IR sensors. Example techniques for performing product validation with IR sensors are described in Application No. 63/276,386, entitled SHOPPING CART WITH INFRARED PRODUCT VALIDATION, which is herein incorporated by reference. As another example, sound verification data (e.g., data that defines a sound that the item produces when placed in the cart 100, as detected by sound sensors) can be used to verify the item 950 according to the cart's sound sensors (e.g., one or more microphones). Example techniques for performing product validation based on sound verification data are described in Application No. 63/276,462, entitled SHOPPING CART WITH SOUND-BASED VALIDATION, which is herein incorporated by reference. As another example, weight verification data (e.g., data that defines a weight bump that the item generates when placed in the cart 100, as detected by weight sensors) can be used to verify the item 950 according to the cart's weight sensors (e.g., one or more scales). Other types of item verification data and corresponding sensors are possible, and the various sensor types can be used singly or in combination with other sensors (and optionally, in combination with item location data) to verify scanned items. Item verification can include determining whether item verification data for a scanned item matches data collected by the corresponding sensors, as described in further detail in examples below.

In some implementations, item location data can be used to verify an item. For example, the item data 934 can include item location data 924 (e.g., including one or more item locations 926 according to a planogram and/or a heat map of past item scans by other mobile device users) for the item 950. As items are scanned by multiple different users in the retail environment 908, potentially through the use of multiple different applications (e.g., customers using a shopping application, employees using an inventory application, etc.), location data for each item scan can be determined (e.g., based on wireless signal strength data, Global Positioning System (GPS) data, or other suitable location data provided through use of a scanning device) and can be stored (e.g., by the item data store 920) for use in aggregating and providing the item location data 924. In general, location data for an item that has been collected within a certain period of time (e.g., the past day, the past week, the past month, or another suitable period of time) can be used for aggregating and providing item location data. If an item becomes available at a new location, for example, the new location can eventually be recognized as a valid location for the item, as the item is scanned at the new location by multiple different users over time. Item verification can include determining whether a location of a current scan of an item matches a determined item location 926 for the item according to its item location data 924 (e.g., the current scan location is within a threshold distance of five feet, 10 feet, 20 feet, or another suitable threshold distance of the determined item location). When the location of the current item scan matches the determined item location 926 according to its item location data 924, for example, the scanned item can be verified with a higher level of confidence, whereas the scanned item may be unverified (or verified with a lower level of confidence) when the location of the current item scan does not match the determined item location. By considering the location of a current item scan relative to a determined item location according to its item location data when verifying an item, for example, deceptive practices (e.g., switching a high-cost item with a low-cost item having a similar physical profile) can be potentially be detected and prevented.

In some implementations, once an item has been successfully or unsuccessfully verified, a user can be notified through output generated by the mobile device 112 and/or the shopping cart 100. In the present example, the mobile device 112 (shown here as device 112b) can add the selected item (e.g., one of items 950) to a virtual shopping cart maintained by the device 112 and/or servers 906, which can be presented to the user at interface 960. As another example, the shopping cart 100 can provide an indication (e.g., visual, sonic, and/or tactile) of successful and/or unsuccessful item verification. Additional user notifications and interfaces are described in further detail in examples below.

In some implementations, a user may not be notified of an item being successfully or unsuccessfully verified. For example, item verification results can be maintained in association with a virtual shopping cart (e.g., with a scanned item being added to the cart, along with its verification status), without providing the item verification results to the user. By maintaining item verification results in the background in association with the user's virtual shopping cart, for example, a relatively uninterrupted shopping experience can be facilitated, while tracking the verification statuses of items that have been added to the cart. The verification statuses of each item in the virtual shopping cart can be aggregated, possibly with one or more other factors (e.g., a user's purchase history, a user's reputation score, etc.) to determine an overall verification status of the shopping cart 100. A high user reputation score, for example, can indicate a high level of virtual cart accuracy for the user for previous shopping trips (e.g., a virtual cart being shown to accurately represent the contents of a physical cart during checkout), whereas low reputation scores can indicate a low level of virtual cart accuracy for the user for previous shopping trips (e.g., a virtual cart being shown to not accurately represent the contents of a physical cart during checkout). The overall verification status of the shopping cart, for example, can be used as a factor in directing the user to an appropriate station during a checkout process.

During stage (C), a shopping cart may potentially be authorized for automated checkout. For example, the system 900 can perform operation 936, in which a determination of whether the user of the mobile device 112 (shown here as device 112C) and the shopping cart 100 (shown here as cart 100C) is authorized to proceed to an automated checkout station 970, or is to proceed to a manual checkout station 972. The automated checkout station 970, for example, can include RFID scanners, weight sensors, and/or high resolution cameras that can be used to determine whether the contents of the shopping cart 100, as tallied by the mobile device 112, correspond to what is being detected by the station 970. For example, the station 970 can measure the weight of the cart 100 and its contents, and determine whether the measured weight is within a threshold of the expected weight of the cart 100 and its contents, according to the mobile device tally. As another example, the station can use its RFID scanners to verify items with RFID tags that automated device sensors (e.g., IR scanners) are unable to verify with confidence. As another example, the station can use its cameras to capture one or more images of the cart 100 and its contents. If the cart 100 is validated across one or more of these signals, the customer may be automatically charged for the tallied contents and permitted to simply depart the retail environment 908. The manual checkout station 972, for example, can be a Point of Sale (POS) terminal at which items are removed from the shopping cart 100, an employee of the retail environment 908 individually scans the items to tally a total price, and the user provides a payment before departing the environment 908.

In general, determining whether a shopping cart is authorized for automated checkout can include determining a cart accuracy score for a virtual shopping cart, from verification results associated with items that have been placed in the shopping cart. Determining the cart accuracy score used for cart authorization, for example, can be based on a quantity of items in the cart (e.g., an absolute quantity, a percentage quantity, etc.) that have been verified, and/or an aggregated confidence score (e.g., averaged and/or weighted) for items in the cart, as described in further examples below. In some implementations, one or more additional authorization factors (e.g., a user's purchase history, a user's reputation score, etc.) can be considered when determining whether a shopping cart is authorized for automated checkout. For example, if a user is a regular customer of a store, and/or is a user of one or more additional services provided by the store (e.g., credit services, loyalty services, etc.), and/or has a high reputation score, a lower cart accuracy score may qualify the user for an automated checkout—whereas if the user is not a regular customer, and/or is not a user of additional services, and/or has a low reputation score, a higher cart accuracy may qualify the user for the automated checkout. In the present example, the shopping cart 100 is authorized for automated checkout (e.g., the virtual cart's accuracy score meets a threshold value), and the user is notified through output generated by the mobile device 112, which can be presented to the user at interface 962. At stage ($D_1$), for example, the user can proceed with the mobile device 112 and the shopping cart 100 to the automated checkout station 970 to perform an automated checkout operation 938. However, if the shopping cart 100 were not to be authorized for automated checkout (e.g., the virtual cart's accuracy score does not meet a threshold value), the user would be notified through output generated by the mobile device 112, and at stage ($D_2$), for example, the user could proceed with the mobile device 112 and the shopping cart 100 to the manual checkout station 972 to perform a manual checkout operation 940.

In some implementations, an additional item check may be performed after an automated checkout operation. For example, after the automated checkout operation 938 is performed on the shopping cart 100 (at stage ($D_1$)), the user can be presented with further instructions (e.g., through output presented by the mobile device 112, through an indicator on the shopping cart 100, and/or through output presented by the automated checkout station 970) for completing the shopping trip. If the automated checkout station 970 confirms that the user's virtual shopping cart accurately represents the contents of the physical shopping cart 100, for example, the user's transaction can be finalized and the user can be permitted to depart the retail environment 908. If the automated checkout station 970 is unable to confirm that the user's virtual shopping cart accurately represents the contents of the physical shopping cart 100 within a threshold level of certainty, for example, an employee of the retail environment 908 can be directed to perform an additional item verification (e.g., by scanning one or more random items, high value items, and/or specifically unverified items in the shopping cart 100). If the shopping cart 100 passes the additional item verification, for example, the user's transaction can be finalized and the user can be permitted to depart the retail environment 908. If, however, the shopping cart 100 does not pass the additional item verification, for example, the user can be directed to the manual checkout station 972 to perform the manual checkout operation 940. Similarly, if the automated checkout station 970 determines that the user's virtual shopping cart does not accurately represent the contents of the physical shopping cart 100 (e.g., one or more items were detected by the automated checkout station 970 as being in the shopping cart 100 that are not in the user's virtual shopping cart), the user can be directed to the manual checkout station 972 to perform the manual checkout operation 940.

In some implementations, upon completion of a shopping trip, a user's transaction may be automatically finalized and the user may be permitted to depart without first proceeding to an automated checkout station or a manual checkout station. For example, if a virtual cart's accuracy score meets a threshold value and one or more additional authorization factors pertain to the user (e.g., the user's reputation score meets a threshold value and/or the user subscribes to a loyalty program and/or uses credit services of the store), the user can be provided with a notification (e.g., on the mobile device 112 and/or the shopping cart 100) to confirm the transaction. After the user's transaction for the shopping trip is finalized, for example, the user can be permitted to simply depart the store. The example system 900 is further described in Application No. 63/276,460, entitled VERIFICATION OF ITEMS PLACED IN PHYSICAL SHOPPING CART, which is herein incorporated by reference. Moreover, example techniques for determining whether a shopping cart is authorized for automated checkout and verifying items by an automated checkout system are described in U.S. Application No. 63/276,471, entitled VERIFICATION OF ITEMS BY AUTOMATED CHECKOUT SYSTEM, which is herein incorporated by reference.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for validating products that are added to a shopping cart, the system comprising:
   a shopping cart configured to retain one or more products and be pushed by a user in a retail environment, wherein the shopping cart includes product validation hardware and a controller, the product validation hardware including a plurality of motion sensors positioned at least along a top perimeter of the shopping cart and at least one weight sensor positioned inside the shopping cart, wherein the shopping cart is configured to:
      receive, from one or more of the plurality of motion sensors, motion data when the product is detected to be entering a top horizontal plane of the shopping cart;

receive, from the at least one weight sensor, weight change data that is collected in real-time as the product settles inside the shopping cart;

scale the weight change data based on an expected weight change signature curve for the product; and correlate the scaled weight change data with the motion data to generate a weight signature over time for the product, wherein the weight signature is used to validate the product that is added to the shopping cart; and one or more processors that is in communication with the shopping cart, wherein the one or more processors is configured to:

receive, from the shopping cart, the weight signature over time for the product;

validate the product based on the weight signature; and return results from validating the product.

2. The system of claim 1, further comprising a mobile device in communication with at least one of the product validation hardware and the controller of the shopping cart, wherein the mobile device is configured to:

receive user input indicating a scan of the product to be added to the shopping cart;

identify a unique identifier for the product based on the scan; and retrieve, from a data store and based on the unique identifier, product information for the scanned product.

3. The system of claim 2, wherein the mobile device is further configured to:

receive, from the shopping cart, the weight signature over time for the product;

compare the weight signature to the product information of the scanned product to determine whether the weight signature is within a predetermined threshold range of the product information; and generate, based on determining that the weight signature is within the predetermined threshold range of the product information, output indicating that the product added to the shopping cart is validated.

4. The system of claim 3, wherein comparing the weight signature to the product information includes:

graphing the weight signature as a curve with an expected weight change signature curve for the scanned product; and comparing at least one of (i) timing of inflection points of the weight signature curve and the expected weight change signature curve within a predetermined time interval, (ii) maximum amplitude of the weight signature curve and the expected weight change signature curve within the predetermined time interval, and (iii) minimum amplitude of the weight signature curve and the expected weight change signature curve within the predetermined time interval.

5. The system of claim 2, wherein:

the mobile device is configured to transmit, to the shopping cart, the product information of the scanned product, and the shopping cart is further configured to:

compare the weight signature to the product information of the scanned product to determine whether the weight signature is within a predetermined threshold range of the product information; and generate, based on determining that the weight signature is within the predetermined threshold range of the product information, output indicating that the product added to the shopping cart is validated.

6. The system of claim 1, wherein the shopping cart is further configured to poll the at least one weight sensor for weight change data based on receiving the motion data from the one or more of the plurality of motion sensors.

7. A system for validating products that are added to a shopping cart, the system comprising:

a shopping cart configured to retain one or more products and be pushed by a user in a retail environment, wherein the shopping cart includes product validation hardware and a controller, the product validation hardware including a plurality of motion sensors positioned at least along a top perimeter of the shopping cart and at least one weight sensor positioned inside the shopping cart; and a mobile device in communication with at least one of the product validation hardware and the controller of the shopping cart, wherein the mobile device is configured to:

receive user input indicating a scan of a product to be added to the shopping cart;

identify a unique identifier for the product based on the scan;

retrieve, from a data store and based on the unique identifier, product information for the scanned product; and transmit, to the controller, the product information, wherein the controller of the shopping cart is further configured to:

receive, from the mobile device, the product information;

receive, from one or more of the plurality of motion sensors, motion data when the product is detected to be entering a top horizontal plane of the shopping cart;

receive, from the at least one weight sensor, weight change data that is collected in real-time as the product settles inside the shopping cart;

correlate the weight change data with the motion data to generate correlated data, wherein correlating the weight change data with the motion data further comprises scaling the weight change data based on an expected weight change signature curve for the scanned product;

compare the correlated data to the product information of the scanned product to determine whether the correlated data is within a predetermined threshold range of the product information; and generate, based on determining that the correlated data is within the predetermined threshold range of the product information, output indicating that the product added to the shopping cart is validated.

8. The system of claim 7, wherein the correlated data is generated based on applying a machine learning trained model to the weight change data and the motion data, wherein the model was trained using a process comprising:

receiving training data for one or more other products that includes weight data, motion data, other sensor data, and positive product data correlations, training the model to correlate the received training data for the one or more other products, and outputting the model for runtime use.

9. The system of claim 7, wherein:

the product information includes the expected weight change signature curve for the scanned product, and comparing the correlated data to the product information includes graphing the correlated data as a curve with the weight change signature curve and comparing at least one of (i) timing of inflection points of the correlated data curve and the weight change signature curve within a predetermined time interval, (ii) maximum amplitude of the correlated data curve and the weight change signature curve within the predetermined time interval, and (iii) minimum amplitude of the correlated data curve and the weight change signature curve within the predetermined time interval.

10. The system of claim 7, wherein the motion data is received at a first time and the weight change data is received at a second time.

11. The system of claim 7, wherein the mobile device is configured to:
receive the output indicating that the product added to the shopping cart is validated; and
receive user input indicating a scan of another product that is to be added to the shopping cart.

12. The system of claim 7, wherein the mobile device is configured to:
receive the output indicating that the product added to the shopping cart is validated; and
complete a checkout process at the mobile device.

13. The system of claim 7, wherein the controller is further configured to generate, based on determining that the correlated data is not within the predetermined threshold range of the product information, output indicating that the product added to the shopping cart is not validated.

14. The system of claim 13, wherein the output includes a notification to be presented to the user at the mobile device, wherein the notification prompts the user to (i) rescan the product that was added to the shopping cart or (ii) put a correct product that corresponds to the scanned product in the shopping cart.

15. The system of claim 13, wherein the controller is further configured to generate, based on determining that the correlated data is not within the predetermined threshold range of the product information, instructions that, when executed at the mobile device, prevent the user from continuing to scan products with the mobile device until the product that was added to the shopping cart is validated.

16. The system of claim 13, wherein the output includes a notification to be transmitted to a computing device of a retail environment employee for presentation to the retail environment employee, wherein the notification indicates that the user is engaging in suspicious activity.

17. The system of claim 7, wherein:
the mobile device is configured to identify the unique identifier for the scanned product based on the scan and transmit the unique identifier to the controller, and
the controller is configured to retrieve, from the data store and based on the unique identifier, the product information for the scanned product.

18. The system of claim 7, wherein the mobile device is further configured to receive the correlated data from the controller and compare the correlated data to the product information of the scanned product to determine whether the correlated data is within a predetermined threshold range of the product information.

19. A system for validating products that are added to a shopping cart, the system comprising:
a shopping cart configured to retain one or more products and be pushed by a user in a retail environment, wherein the shopping cart includes product validation hardware and a controller, the product validation hardware including a plurality of motion sensors positioned at least along a top perimeter of the shopping cart and at least one weight sensor positioned inside the shopping cart, wherein the shopping cart is configured to:
receive, from one or more of the plurality of motion sensors, motion data when the product is detected to be entering a top horizontal plane of the shopping cart;
receive, from the at least one weight sensor, weight change data that is collected in real-time as the product settles inside the shopping cart; and
correlate, based on applying a machine learning model that was trained to correlate data for the one or more products, the weight change data with the motion data to generate a weight signature over time for the product, wherein the weight signature is used to validate the product that is added to the shopping cart; and
one or more processors that is in communication with the shopping cart, wherein the one or more processors is configured to:
receive, from the shopping cart, the weight signature over time for the product;
validate the product based on the weight signature; and
return results from validating the product.

20. The system of claim 19, further comprising a mobile device in communication with at least one of the product validation hardware and the controller of the shopping cart, wherein the mobile device is configured to:
receive user input indicating a scan of the product to be added to the shopping cart;
identify a unique identifier for the product based on the scan; and
retrieve, from a data store and based on the unique identifier, product information for the scanned product.

21. The system of claim 19, wherein the controller includes the one or more processors.

22. The system of claim 19, further comprising a mobile device in communication with the shopping cart, wherein the mobile device includes the one or more processors.

23. The system of claim 19, further comprising a remote computer system in communication with the shopping cart, wherein the remote computer system includes the one or more processors.

24. The system of claim 1, wherein the controller includes the one or more processors.

25. The system of claim 1, further comprising a mobile device in communication with the shopping cart, wherein the mobile device includes the one or more processors.

26. The system of claim 1, further comprising a remote computer system in communication with the shopping cart, wherein the remote computer system includes the one or more processors.

* * * * *